United States Patent
Tanaka et al.

(10) Patent No.: US 6,314,935 B2
(45) Date of Patent: Nov. 13, 2001

(54) CONTROL SYSTEM FOR AN INTERNAL COMBUSTION ENGINE

(75) Inventors: Hiroshi Tanaka; Toshio Tanahashi, both of Susono; Kenji Katoh, Shizuoka-ken, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/846,354

(22) Filed: May 2, 2001

Related U.S. Application Data

(62) Division of application No. 09/356,453, filed on Jul. 19, 1999.

(30) Foreign Application Priority Data

Jul. 22, 1998 (JP) .................................................. 10-206775
Oct. 6, 1998 (JP) .................................................. 10-284368

(51) Int. Cl.⁷ .............................. F02B 3/02; F02D 41/40; F01N 3/10
(52) U.S. Cl. .............................. 123/298; 60/285; 123/300
(58) Field of Search .................................... 123/276, 279, 123/295, 298, 299, 300; 60/274, 284, 285, 286

(56) References Cited

U.S. PATENT DOCUMENTS

| 4,452,040 | 6/1984 | Kobashi ................................. 60/274 |
|---|---|---|
| 5,224,460 | 7/1993 | Havstad et al. .................. 123/568.14 |
| 5,775,099 | 7/1998 | Ito et al. ................................. 60/274 |
| 5,787,848 | 8/1998 | Stefanopoulou et al. ......... 123/90.15 |
| 5,910,096 | * 6/1999 | Hepburn et al. ....................... 60/274 |
| 5,956,942 | * 9/1999 | Sebastiano et al. .................... 60/274 |
| 6,041,591 | 3/2000 | Kaneko et al. ......................... 60/274 |
| 6,058,700 | * 5/2000 | Yamashita et al. ..................... 60/285 |
| 6,109,024 | * 8/2000 | Kinugasa et al. ...................... 60/285 |

FOREIGN PATENT DOCUMENTS

| 6-212961 | 8/1994 | (JP) . |
|---|---|---|
| 9-32619 | 2/1997 | (JP) . |
| 6-159042-A | * 6/1994 | (JP) ........................................ 60/282 |

\* cited by examiner

*Primary Examiner*—Tony M. Argenbright
(74) *Attorney, Agent, or Firm*—Oliff & Berridge, PLC

(57) ABSTRACT

A control system for an internal combustion engine comprising a direct cylinder fuel injection valve for directly injecting the fuel into a cylinder of an internal combustion engine. The main fuel that burns in the cylinder is injected in the latter half of the compression stroke of the cylinder, and the secondary fuel which is the ineffective fuel that does not burn in the cylinder is injected in the latter half of the exhaust stroke, the main fuel and the secondary fuel being injected toward a cavity formed in the top surface of the piston. The main fuel that is injected is deflected by the cavity to form a charge of a combustible air-fuel ratio mixture around the spark plug. When the secondary fuel is injected, the exhaust valve is opening, and the fuel that is deflected is all discharged out of the cylinder through the exhaust port.

10 Claims, 17 Drawing Sheets

CONTROL SYSTEM FOR AN INTERNAL COMBUSTION ENGINE

This is a Division of Application Ser. No. 09/356,453 filed Jul. 19, 1999. The entire disclosure of the prior application(s) is hereby incorporated by reference herein in its entirety.

BACKGROUND OF THE INVENTION

1. Field of the Invention

The present invention relates to a control system for an internal combustion engine. More specifically, the invention relates to a control system for an internal combustion engine, for supplying ineffective fuel which does not burn in the combustion chamber.

2. Description of the Related Art

There has been known a technology for adjusting the air-fuel ratio of the exhaust gas from an engine independently of the engine operating air-fuel ratio (combustion air-fuel ratio in the combustion chamber) by supplying, to the engine, ineffective fuel that does not contribute to the combustion in the combustion chamber. For example, a $NO_X$ occluding and reducing catalyst is disposed in the exhaust passage of the engine which operates at a lean air-fuel ratio, the $NO_X$ occluding and reducing catalyst absorbing $NO_X$ in the exhaust gas when the air-fuel ratio of the exhaust gas flowing in is lean, and releasing and purifying by reduction the absorbed $NO_X$ when the air-fuel ratio in the exhaust gas becomes rich. In this case, the air-fuel ratio of the exhaust gas flowing into the $NO_X$ occluding and reducing catalyst must be set to be rich at regular intervals and the $NO_X$ must be released from the $NO_X$ occluding and reducing catalyst, so that the $NO_X$ occluding and reducing catalyst will not be saturated with $NO_X$ when the engine is operated at a lean air-fuel ratio. In such a case, a change in the engine operating air-fuel ratio from the lean side to the rich side increases the engine output torque; i.e., a change in the air-fuel ratio changes the torque. Upon supplying ineffective fuel that does not contribute to the combustion in the engine combustion chamber, i.e., that does not burn in the engine combustion chamber, therefore, it becomes possible to advantageously change only the air-fuel ratio of the exhaust gas independently from the engine operating air-fuel ratio. In an engine having direct cylinder fuel injection valves for directly injecting the fuel into the cylinders, the ineffective fuel can be supplied into the cylinders by secondary fuel injection in the expansion stroke or in the exhaust stroke of the cylinders. In an engine having exhaust port fuel injection valves for injecting the fuel into the exhaust port of the engine, further, the ineffective fuel can be supplied into the exhaust ports by the exhaust port fuel injection.

The fuel injected into the cylinder during the expansion stroke or the exhaust stroke or the fuel injected into the exhaust port of the cylinder is vaporized without being burned and is discharged together with the exhaust gas. That is, the ineffective fuel that is supplied does not contribute to the combustion in the engine, but the amount of the unburned HC component in the exhaust gas from the engine increases by an amount of the ineffective fuel that is supplied to establish a rich air-fuel ratio. By supplying the ineffective fuel to the engine, therefore, it is possible to change the air-fuel ratio only in the exhaust gas from the engine without affecting the engine operating air-fuel ratio.

A device for supplying the ineffective fuel of this type has been disclosed in, for example, Japanese Unexamined Patent Publication (Kokai) No. 6-212961.

According to the device of this publication, a $NO_X$ occluding and reducing catalyst is disposed in the exhaust passage of a diesel engine to absorb the $NO_X$ in the exhaust gas when the air-fuel ratio of the exhaust gas flowing in is lean and to release the $NO_X$ when the oxygen concentration has decreased in the exhaust gas that is flowing in. Under normal condition, the main fuel is injected into the cylinder near the compressive top dead center of the cylinder of the engine and, when the $NO_X$ is to be released from the $NO_X$ occluding and reducing catalyst, the secondary fuel is injected during the expansion stroke or the exhaust stroke of the engine in addition to injecting the main fuel. The fuel injected into the cylinder during the expansion or exhaust stroke does not contribute to the combustion in the cylinder, i.e., does not burn in the cylinder and is exposed to the burned gas of a high temperature in the cylinder. Therefore, hydrocarbons having large molecular weights in the fuel are decomposed into hydrocarbons having small molecular weights. Besides, the fuel supplied by the secondary fuel injection does not contribute to the combustion but is simply discharged from cylinders together with the exhaust gas. By supplying the ineffective fuel to the engine, therefore, it is made possible to inject the fuel in a relatively large amount for establishing a rich air-fuel ratio in the exhaust gas without increasing the pressure of an explosion in the cylinder even in a diesel engine. According to the device of the above-mentioned publication, when the secondary fuel is injected, the exhaust gas having a rich air-fuel ratio, containing a large amount of hydrocarbons of low molecular weights which are highly active, flows into the $NO_X$ occluding and reducing catalyst in the exhaust passage. When the secondary fuel is injected, therefore, the $NO_X$ that has been absorbed is released from the $NO_X$ occluding and reducing catalyst and is purified by reduction with hydrocarbons in the exhaust gas.

In an engine which effects the secondary fuel injection as done by the device of the above-mentioned publication, however, the fuel supplied by the secondary fuel injection is not completely exhausted during the exhaust stroke but often remains in the cylinder. When the fuel of the secondary fuel injection partly remains in the cylinder, this remaining fuel burns in the cylinder in addition to the fuel supplied by the main fuel injection at the time when the main fuel is injected next time. Accordingly, an amount of fuel burnt in the engine increases, whereby an increased torque is produced by the combustion. This causes a change in the output torque of the engine.

When the ineffective fuel is supplied to the engine by the exhaust port fuel injection without relying upon the secondary fuel injection, on the other hand, the fuel does not remain in the cylinder. In an engine equipped with an exhaust gas recirculation (EGR) device, however, the similar problem may occur when the exhaust port fuel injection is effected.

There has been generally known an exhaust gas recirculation (EGR) device in which the exhaust gas from the engine is partly recirculated into the combustion chamber of an internal combustion engine to lower the combustion temperature in the combustion chamber in order to decrease the amount of $NO_X$ (nitrogen oxides) formed by the combustion. The exhaust gas recirculation system includes an external EGR system in which an exhaust passage of the engine is connected to an intake passage of the engine through an EGR passage, and the amount of the exhaust gas to be recirculated is adjusted by a flow rate adjusting valve (EGR valve) provided in the EGR passage, and an internal EGR system by which the amount of blow back of the burned gas in the combustion chamber caused by the overlapping of valve is adjusted by changing the open-close timings of the intake valve and the exhaust valve of the engine.

When the ineffective fuel is supplied to the engine that utilizes the EGR (exhaust gas recirculation) as described above, there a problem occurs not only when the ineffective fuel is supplied by the secondary fuel injection but also when the ineffective fuel is supplied by the exhaust port injection.

That is, when the ineffective fuel is supplied as described above, the exhaust gas from the engine contains unburned fuel in relatively large amounts. When the exhaust gas is directly recirculated by the EGR device into the combustion chamber of the engine, part of the ineffective fuel that should not burn in the combustion chamber is recirculated into the combustion chamber and burns therein. When the ineffective fuel is supplied while the EGR is being performed, therefore, the fuel is supplied in an excess amount into the engine and the combustion air-fuel ratio becomes excessively rich, whereby the combustion in the combustion chamber becomes unstable or the output torque of the engine increases due to the combustion of excess fuel.

SUMMARY OF THE INVENTION

In view of the problems in the related art as set forth above, the object of the present invention is to provide a control system for an internal combustion engine capable of preventing the combustion from becoming unstable and preventing a change in the output torque caused by the residual fuel or recirculation of the fuel in the combustion chamber, when the fuel is supplied to the engine as ineffective fuel.

The object as set forth above is achieved by a control system for an internal combustion engine according to the present invention, comprising:
  a direct cylinder fuel injection valve for directly injecting the fuel into a cylinder of an internal combustion engine; and
  a fuel injection control means which executes a main fuel injection to inject the fuel that burns in the cylinder by controlling the direct cylinder fuel injection valve, and further executes, as required, a secondary fuel injection to inject the fuel that does not burn in the cylinder during the expansion stroke or the exhaust stroke after the main fuel injection; wherein
  when the secondary fuel injection is being executed, the fuel injection control means controls the secondary fuel injection based on the engine operating conditions in such a manner that the fuel supplied by the secondary fuel injection is exhausted out of the cylinder before the end of the exhaust stroke.

According to this aspect of the invention, the fuel injection control means controls the secondary fuel injection based on the engine operating conditions such as valve timing, rotational speed, etc., and changes, for example, the amount of fuel injection, injection timing, etc., so that the fuel supplied by the secondary fuel injection is all discharged out of the cylinder before the end of the exhaust stroke, i.e., before the exhaust valve is closed. Thus, there remains no fuel in the cylinder, and the engine output torque does not change even when the secondary fuel is injected.

According to another aspect of the present invention, there is provided a control system for an internal combustion engine comprising:
  a direct cylinder fuel injection valve for directly injecting the fuel into a cylinder of an internal combustion engine; and
  a fuel injection control means which executes a main fuel injection to inject the fuel that burns in the cylinder by controlling the direct cylinder fuel injection valve, and executes, as required, a secondary fuel injection to inject the fuel that does not burn in the cylinder during the expansion stroke or the exhaust stroke after the main fuel injection; wherein
  the fuel injection control means advances the timing for injecting the secondary fuel with an increase in the amount of the fuel injected by the secondary fuel injection.

According to this aspect of the invention, the fuel injection control means advances the timing for injecting the secondary fuel with an increase in the amount of the secondary fuel injection. Therefore, even when the amount of the secondary fuel injection is large, a sufficient period of time is maintained before the exhaust valve is closed, and the injected fuel does not remain in the cylinder. Accordingly, the engine output torque does not change even when the secondary fuel is injected.

According to a further aspect of the present invention, there is provided a control system for an internal combustion engine comprising:
  a direct cylinder fuel injection valve for directly injecting the fuel into a cylinder of an internal combustion engine;
  a fuel injection control means which executes a main fuel injection to inject the fuel that burns in the cylinder by controlling the direct cylinder fuel injection valve, and executes, as required, a secondary fuel injection to inject the fuel that does not burn in the cylinder during the expansion stroke or the exhaust stroke after the main fuel injection; and
  a deflecting means for deflecting the flow of the fuel supplied by the secondary fuel injection toward the exhaust port of the cylinder.

According to this aspect of the invention, the deflecting means deflects the fuel supplied by the secondary fuel injection toward the exhaust port. Therefore, the whole amount of the fuel supplied by the secondary fuel injection is discharged from the exhaust port and does not remain in the cylinder. Therefore, the engine output torque does not change even when the secondary fuel is injected.

According to a further aspect of the present invention, there is provided a control system for an internal combustion engine comprising:
  a direct cylinder fuel injection valve for directly injecting the fuel into a cylinder of an internal combustion engine; and
  a fuel injection control means which executes a main fuel injection to inject the fuel that burns in the cylinder by controlling the direct cylinder fuel injection valve, and executes, as required, a secondary fuel injection to inject the fuel that does not burn in the cylinder during the expansion stroke or the exhaust stroke after the main fuel injection; wherein
  the fuel injection control means sets the pressure of the secondary fuel injection to be lower than the pressure of the main fuel injection.

According to this aspect of the invention, the fuel injection control means sets the pressure of the secondary fuel injection to be lower than the pressure of the main fuel injection. Therefore, the fuel supplied by the secondary fuel injection does not collide with the cylinder wall or the piston to adhere thereon, and is discharged together with the exhaust gas from the cylinder. Therefore, no fuel remains in the cylinder, and the engine output torque does not change even when the secondary fuel is injected.

According to a further aspect of the present invention, there is provided a control system for an internal combustion engine comprising:

a direct cylinder fuel injection valve for directly injecting the fuel into a cylinder of an internal combustion engine; and a fuel injection control means which executes a main fuel injection to inject the fuel that burns in the cylinder by controlling the direct cylinder fuel injection valve, and executes, as required, a secondary fuel injection to inject the fuel that does not burn in the cylinder during the expansion stroke or the exhaust stroke after the main fuel injection; wherein the fuel injection control means calculates the amount of fuel remaining in the cylinder, which is part of the fuel supplied by the preceding secondary fuel injection, and corrects the amount of the main fuel injection based on the remaining amount of fuel.

According to this aspect of the present invention, the fuel injection control means calculates the amount of fuel remaining in the cylinder due to the preceding secondary fuel injection, and corrects the amount of the main fuel injection depending upon the remaining amount of fuel. This correction is effected by, for example, decreasing the amount of the main fuel injection by an amount corresponding to the remaining amount of fuel. Therefore, the amount of fuel that contributes to the combustion at the time when the main fuel is injected is maintained at a target amount. Therefore, the engine output torque does not change even when the fuel remains in the cylinder due to the secondary fuel injection.

According to a further aspect of the present invention, there is provided a control system for an internal combustion engine comprising:

a direct cylinder fuel injection valve for directly injecting the fuel into a cylinder of an internal combustion engine; and a fuel injection control means which executes a main fuel injection to inject the fuel that burns in the cylinder by controlling the direct cylinder fuel injection valve, and executes, as required, a secondary fuel injection to inject the fuel that does not burn in the cylinder during the expansion stroke or the exhaust stroke after the main fuel injection; wherein the fuel injection control means, as required, executes the main fuel injection two times by dividing it into a first main fuel injection for forming a uniform air-fuel mixture in the cylinder and a second main fuel injection for forming a charge of a combustible air-fuel ratio mixture in the cylinder, and, when the secondary fuel injection is executed, the fuel injection means calculates the amount of fuel remaining in the cylinder, which is part of the fuel supplied by the preceding secondary fuel injection, and corrects the amount of the first main fuel injection based on the remaining amount of fuel.

According to this aspect of the present invention, the fuel injection control means, as required, executes the main fuel injection twice and, in this case, corrects the amount of the first main fuel injection based on the amount of fuel remaining in the cylinder due to the secondary fuel injection. This correction is effected by, for example, decreasing the amount of the first fuel injection by an amount corresponding to the remaining amount of fuel. The first main fuel injection is for forming a uniform mixture in the cylinder whereas the second main fuel injection is for forming a stratified charge of the mixture. On the other hand, the fuel remaining in the cylinder forms a uniform mixture in the cylinder. When the amount of the first main fuel injection is normally set, therefore, the air-fuel ratio of the formed uniform mixture becomes more rich than the target value. According to the present invention, therefore, the amount of the first main fuel injection is corrected based on the remaining amount of fuel, so that the air-fuel ratio of the uniform mixture formed in the cylinder is maintained at the target value.

According to a further aspect of the present invention, there is provided a control system for an internal combustion engine comprising:

an ineffective fuel supply means for supplying ineffective fuel that does not burn in the combustion chamber of an internal combustion engine;

an EGR means for recirculating the exhaust gas from the engine into the combustion chamber of the engine; and an EGR limiting means for limiting the exhaust gas recirculated by the EGR means when the ineffective fuel is being supplied to the engine by the ineffective fuel supply means.

According to this aspect of the present invention, the EGR is limited by the EGR limiting means when the ineffective fuel is being supplied. Therefore, the ineffective fuel is recirculated in a decreased amount into the combustion chamber of the engine together with the recirculated exhaust gas, making it possible to prevent the combustion in the combustion chamber from becoming unstable and to prevent a change in the output torque. Here, "limit the recirculation of exhaust gas" includes both the case where the exhaust gas is recirculated in a decreased amount and the case where the recirculation of the exhaust gas is completely interrupted.

According to a further aspect of the present invention, there is provided a control system for an internal combustion engine comprising:

an ineffective fuel supply means for supplying ineffective fuel that does not burn in the combustion chamber of an internal combustion engine;

an EGR means for recirculating the exhaust gas from the engine into the combustion chamber of the engine; and an ineffective fuel limiting means for limiting the supply of the ineffective fuel by the ineffective fuel supply means when the exhaust gas is recirculated by the EGR means.

According to this aspect of the present invention, the supply of the ineffective fuel is limited by the ineffective fuel limiting means when the EGR is executed. Therefore, the ineffective fuel is recirculated into the combustion chamber of the engine together with the recirculated exhaust gas. Here, "limit the supply of the ineffective fuel" includes both the case where the ineffective fuel is supplied in a decreased amount and the case where the supply of the ineffective fuel is completely interrupted.

According to a further aspect of the present invention, there is provided a control system for an internal combustion engine comprising:

a main fuel supply means for supplying, into the engine, the fuel that burns in the combustion chamber based on the operating conditions of the internal combustion engine;

an ineffective fuel supply means for supplying, into the engine, the ineffective fuel that does not burn in the combustion chamber of the engine;

an EGR means for recirculating the exhaust gas of the engine into the combustion chamber of the engine; and a correction means for estimating the amount of the ineffective fuel in the exhaust gas recirculated by the EGR means to correct the amount of fuel supplied to the engine by the main fuel supply means based on the estimated amount.

According to this aspect of the present invention, the amount of the main fuel is corrected depending upon the amount of the ineffective fuel that recirculates into the combustion chamber together with the exhaust gas. Therefore, the fuel is supplied in a proper amount into the combustion chamber based on the engine operating conditions irrespective of the recirculating amount of the ineffective fuel, preventing the combustion in the combustion chamber from losing stability and preventing a change in the output torque.

BRIEF DESCRIPTION OF THE DRAWINGS

The present invention will be better understood from the description as set forth hereinafter with reference to the accompanying drawings in which.

DESCRIPTION OF THE PREFERRED EMBODIMENTS

Hereinafter, embodiments of the control system according to the present invention will be explained with reference to the attached drawings.

Figure 1:
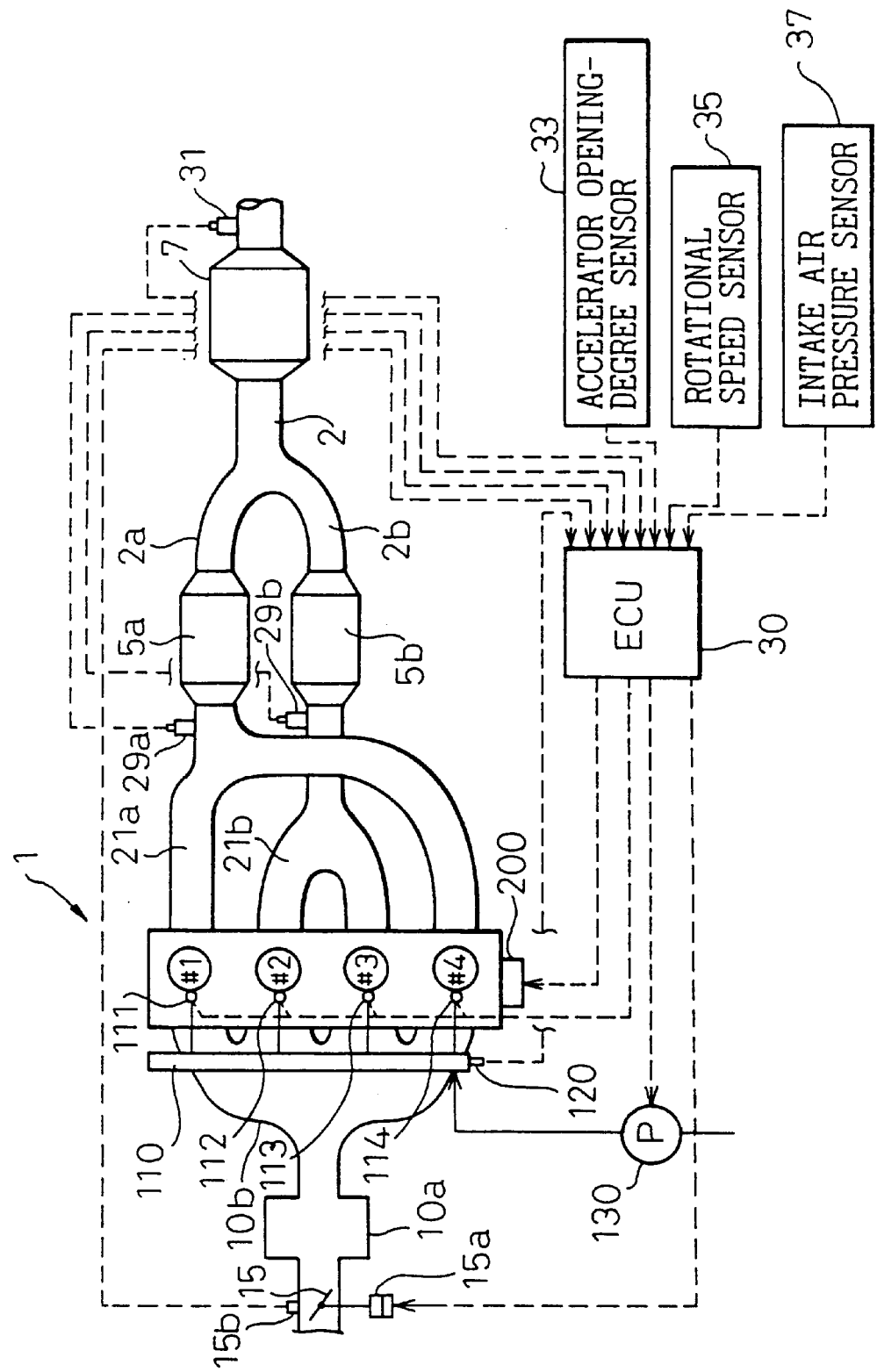
FIG. 1 is a diagram schematically illustrating the general construction of an embodiment when the present invention is applied to an internal combustion engine for automobiles.

FIG. 1 is a view schematically illustrating the constitution of an embodiment in which a fuel injection device of the present invention is applied to an internal combustion engine for an automobile.

In FIG. 1, reference numeral 1 denotes an internal combustion engine for an automobile. In this embodiment, the engine 1 is a four-cylinder gasoline engine having four cylinders #1 to #4 which are equipped with fuel injection valves 111 to 114 for directly injecting fuel into the cylinders. As will be described later, the internal combustion engine 1 of this embodiment is a lean-burn engine that can be operated at an air-fuel ratio higher (more lean) than the stoichiometric air-fuel ratio.

In this embodiment, further, the cylinders #1 to #4 are grouped into two groups of cylinders each group including two cylinders so that the ignition timings will not take place consecutively (in the embodiment of FIG. 1, for example, the order of igniting the cylinders is 1-3-4-2, the cylinders #1 and #4 constituting one group of cylinders, and the cylinders #2 and #3 constituting another group of cylinders). The exhaust port of each cylinder is connected to an exhaust manifold of each group of cylinders, and is connected to an exhaust passage of each group of cylinders. In FIG. 1, reference numeral 21a denotes an exhaust manifold for connecting exhaust ports of the group of the cylinders #1 and #4 to an independent exhaust passage 2a, and reference numeral 21b denotes an exhaust manifold for connecting exhaust ports of the group of the cylinders #2 and #4 to an independent exhaust passage 2b. In this embodiment, start catalysts (hereinafter referred to as "SCs") 5a and 5b comprising a three-way catalyst are arranged in the independent exhaust passages 2a and 2b. The independent exhaust passages 2a and 2b meet together in a common exhaust passage 2 on the downstream side of the SCs.

An $NO_X$ occluding and reducing catalyst 7 that will be described later is arranged in the common exhaust passage 2. In FIG. 1, reference numerals 29a and 29b denote air-fuel ratio sensors arranged on the upstream side of the start catalysts 5a and 5b of the independent exhaust passages 2a and 2b, and reference numeral 31 denotes an air-fuel ratio sensor arranged at an outlet of the $NO_X$ occluding and reducing catalyst 7 in the exhaust passage 2. The air-fuel ratio sensors 29a, 29b and 31 are so-called linear air-fuel ratio sensors that produce voltage signals corresponding to the air-fuel ratio of the exhaust gas over a wide range of air-fuel ratios.

In FIG. 1, further, intake ports of the cylinders #1 to #4 of the engine 1 are connected to a surge tank 10a through the intake manifold 10b, the surge tank 10a being connected to a common intake passage 10. In this embodiment, further, a throttle valve 15 is installed in the intake passage 10. The throttle valve 15 in this embodiment is a so-called electronically controlled throttle valve which is driven by an actuator 15a of a suitable form such as a step motor to define a degree of opening based on a control signal from an ECU 30 that will be described later. In FIG. 1, further, reference numeral 15b denotes a throttle valve opening-degree sensor (throttle sensor) for detecting the opening degree of the throttle valve 15.

In this embodiment, the direct cylinder fuel injection valves 111 to 114 are separately connected to a reservoir (common rail) 110 to inject the fuel of a high pressure in the common rail 110 into the cylinders. In FIG. 1, reference numeral 130 denotes a fuel pump comprising a high-pressure pump such as plunger pump. The fuel pump 130 supplies a high pressure fuel to the common rail 110 at a timing just after the fuel is injected by the fuel injection valves (111 to 114).

In FIG. 1, reference numeral 200 denotes a variable valve timing device for varying the valve timings of the engine 1. In this embodiment, the variable valve timing device 200 may be any known type provided it is capable of changing the valve timings of the engine based on an instruction signal from an ECU 30 that will be described later, and may be either one which changes the open-close timings only of the intake valves and/or the exhaust valves, or one which changes the valve lift in addition to the open-close timings. The valve timings may be changed either continuously or stepwisely.

In FIG. 1, reference numeral 30 denotes the ECU (engine control unit) for controlling the engine 1. The ECU 30 comprises a widely known microcomputer having RAM, ROM and CPU that are connected together through a bidirectional bus, and executes basic control operations such as controlling the main fuel injection and the ignition timings. In this embodiment, the ECU 30 further works to change the combustion in the cylinder into a rich air-fuel ratio during a regenerating operation of the $NO_X$ occluding and reducing catalyst that will be described later, and controls the secondary fuel injection by injecting the secondary fuel during the expansion or exhaust stroke of each cylinder to change the air-fuel ratio of the exhaust gas flowing into the $NO_X$ occluding and reducing catalyst to a rich air-fuel ratio within a short period of time.

The input port of the ECU 30 receives signals from the air-fuel ratio sensors 29a and 29b representing the exhaust gas air-fuel ratios at the inlet of the start catalysts 5a and 5b, a signal from the air-fuel ratio sensor 31 representing an exhaust gas air-fuel ratio at the outlet of the $NO_X$ occluding and reducing catalyst 7, a signal corresponding to the intake air pressure of the engine from an intake-air-pressure sensor 37 provided in the surge tank 10a, and a signal from the accelerator opening-degree sensor 33 representing the amount of the accelerator pedal depressed by the driver (accelerator opening degree), and a pulse signal from a rotational speed sensor 35 disposed near the crankshaft (not shown) of the engine after every predetermined rotational angle of the engine crankshaft. The ECU 30 calculates the rotational angle of the crankshaft from the pulse signal, and calculates the rotational speed of the engine from the frequency of the pulse signals. Further, the input port of the ECU 30 receives a signal from a fuel pressure sensor 120 arranged in the common rail 110 representing the fuel pressure in the common rail 110, and a signal from the throttle valve opening-degree sensor 15b representing the opening degree of the throttle valve 15.

In order to control the amounts of fuel injection into the cylinders and to control the fuel injection timings, further, the output port of the ECU 30 is connected to fuel injection valves 111 to 114 of the cylinders through a fuel injection circuit (not shown), and is further connected to the actuator 15b of the throttle valve 15 through a drive circuit (not shown) to control the opening degree of the throttle valve 15.

In addition to the above-mentioned control operations, the ECU 30 controls by feedback the rate of the fuel supplied by the fuel pump 130 based on the signal representing the fuel pressure in the common rail 110 input from the fuel pressure sensor 120, so that the fuel pressure in the common rail is adjusted to a target value. The fuel is supplied from the fuel pump 130 to the common rail 110 at a timing just after the fuel is injected by the fuel injection valves 111 to 114.

The output port of the ECU 30 is connected to the variable valve timing device 200 through a drive circuit (not shown) to control the valve timings of the engine 1 based on the engine load conditions (degree of accelerator opening, engine rotational speed).

In this embodiment, the main fuel injection of the engine 1, i.e., the injection of fuel for combustion in the cylinder, is controlled in the following five modes based upon the loads exerted on the engine:

① A lean air-fuel ratio stratified charge combustion (fuel is injected in the compression stroke).

② A lean air-fuel ratio uniform mixture/stratified charge combustion (fuel is injected in the suction stroke and in the compression stroke).

③ A lean air-fuel ratio uniform mixture/stratified charge combustion (fuel is injected in the suction stroke).

④ A stoichiometric air-fuel ratio uniform mixture combustion (fuel is injected in the suction stroke).

⑤ A rich air-fuel ratio uniform mixture combustion (fuel is injected in the suction stroke).

That is, the lean air-fuel ratio stratified charge combustion ① is carried out in the light-load operating region of the engine 1. In this state, the fuel is injected into the cylinders only one time in the latter half of the compression stroke in each cylinder, and the injected fuel forms a charge of a combustible mixture near the spark plug in the cylinder. In this operating state, further, the amount of fuel injected is very small, and the air-fuel ratio in the cylinder as a whole becomes from about 25 to about 30.

As the load increases from the above-mentioned state ① to enter into the low-load operation region, there takes place the above-mentioned lean air-fuel ratio uniform mixture/stratified charge combustion ②. The amount of fuel injected into the cylinder increases with an increase in the load exerted on the engine. In the above-mentioned stratified charge combustion ①, the fuel is injected in the latter half of the compression stroke, whereby the injection time is limited and limitation is imposed on the amount of fuel for forming the stratified charge. In this load region, therefore, the fuel is injected in advance in the former half of the suction stroke in an amount to compensate for the shortage of the fuel injected in the latter half of the compression stroke, thereby to supply the fuel in a target amount into the cylinder. The fuel injected into the cylinder in the former half of the suction stroke forms a very lean and uniform mixture before being ignited. In the latter half of the compression stroke, the fuel is further injected into this very lean and uniform mixture in order to form the charge of an ignitable and combustible mixture near the spark plug. At the time of ignition, this combustible mixture charge starts burning, and the flame propagates to the surrounding lean mixture charge, so that the combustion takes place stably. In this state, the amount of fuel injected in the suction stroke and in the compression stroke is larger than that of the mode ①, but the air-fuel ratio as a whole is still lean (e.g., air-fuel ratio of about 20 to about 30).

When the load on the engine further increases, the engine 1 is operated in the lean air-fuel ratio uniform mixture combustion ③. In this state, the fuel is injected only one time in the former half of the suction stroke, and the amount of the injected fuel becomes larger than that of the mode ②. The uniform air-fuel mixture formed in the cylinder in this state has a lean air-fuel ratio (e.g., air-fuel ratio of from about 15 to about 25) relatively close to the stoichiometric air-fuel ratio.

As the load on the engine further increases to enter into the high-load operation region of the engine, the amount of fuel becomes larger than that of the mode ③, and the engine is operated in the stoichiometric air-fuel ratio uniform mixture operation ④. In this state, a uniform mixture of the stoichiometric air-fuel ratio is formed in the cylinder, and the engine output increases. When the load on the engine further increases to enter into the full-load operation of the engine, the amount of fuel injection is further increased in excess of that of the mode ④, and the engine is operated in the rich air-fuel ratio uniform mixture operation ⑤. In this state, the uniform mixture formed in the cylinder becomes a rich air-fuel ratio (e.g., air-fuel ratio of from about 12 to about 14).

In this embodiment, optimum operation modes ① to ⑤ have been empirically set based upon the degree of accelerator opening (amount of the accelerator pedal depressed by the driver) and the rotational speed of the engine, and a map using the degree of accelerator opening and the engine rotational speed is stored in the ROM of the ECU 30. When the engine 1 is in operation, the ECU determines which one of the above-mentioned operation modes ① to ⑤ be selected based on the degree of accelerator opening detected by the accelerator opening-degree sensor 37 and the rotational speed of the engine, and determines the amount of fuel injection, timing for fuel injection, the number of times of injection and the degree of throttle valve opening based on each of the modes.

When the any one of the modes ① to ③ (lean air-fuel ratio combustion) is selected, the ECU 30 determines the amount of fuel injection from the degree of accelerator opening and the rotational speed of the engine based on a map that has been prepared in advance for each of the modes ① to ③. When the mode ④ or ⑤ (stoichiometric air-fuel ratio or rich air-fuel ratio uniform mixture combustion) is selected, the ECU 30 sets the amount of fuel injection based on the intake air pressure detected by the intake air pressure sensor 37 and the rotational speed of the engine by using a map that has been prepared in advance for each of the modes ④ and ⑤.

When the mode ④ (stoichiometric air-fuel ratio uniform mixture combustion) is selected, the ECU 30 controls the air-fuel ratio by correcting the amount of fuel injection calculated above by feedback based on the outputs of the air-fuel ratio sensors 29a and 29b, so that the air-fuel ratio of the exhaust gas emitted by the engine becomes the stoichiometric air-fuel ratio.

The start catalysts (SCs) 5a and 5b are constituted as a three-way catalyst by using a honeycomb-shaped substrate of cordierite or the like, forming a thin coating of alumina on the surface of the substrate, and carrying a novel metal catalyst component such as platinum Pt, palladium Pd or rhodium Rh on the alumina layer. The three-way catalyst highly efficiently removes the three components, i.e., HC, CO and $NO_X$ near the stoichiometric air-fuel ratio. The three-way catalyst exhibits a decreased ability for reducing $NO_X$ when the air-fuel ratio of the exhaust gas flowing in becomes higher than the stoichiometric air ratio. When the engine 1 is operating at a lean air-fuel ratio, therefore, the three-way catalyst is not capable of removing $NO_X$ in the exhaust gas to a sufficient degree.

In this embodiment, the start catalysts (SCs) 5a and 5b chiefly work to purify the exhaust gas of when the engine 1 is operating at a rich air-fuel ratio immediately after the cold starting and to purity the exhaust gas of when the engine 1 is operating at the stoichiometric air-fuel ratio under normal operating condition. Therefore, the start catalysts (SCs) 5a and 5b are disposed in the exhaust passages 2a and 2b at positions close to the engine 1 and have a relatively small capacity to decrease their heat capacity, so that they can be heated to their activated temperature within a short period of time after the start of the engine to start their catalytic activity.

Next, described below is the $NO_X$ occluding and reducing catalyst 7 according to this embodiment. The $NO_X$ occluding and reducing catalyst 7 according to this embodiment uses alumina as a substrate to carry at least one component selected from the alkali metals such as potassium K, sodium Na, lithium Li and cesium Cs, alkaline earth elements such as barium Ba and calcium Ca, and rare earth elements such as lanthanum La, cerium Ce and yttrium Y, as well as a noble metal such as platinum Pt. The $NO_X$ occluding and reducing catalyst exhibits the action of absorbing and releasing $NO_x$, i.e., absorbs $NO_X$ (nitrogen oxides) in the exhaust gas in the form of nitric acid ions $NO_3^-$ when the air-fuel ratio of the exhaust gas flowing in is lean, and releases the absorbed $NO_X$ when the air-fuel ratio of the exhaust gas flowing in becomes smaller than the stoichiometric air-fuel ratio (rich air-fuel ratio).

The mechanism for absorbing and releasing $NO_X$ will be described next with reference to the case of using platinum Pt and barium Ba. The same mechanism, however, is created even when other noble metals, alkali metals, alkaline earth elements and rare earth elements are used.

When the concentration of oxygen increases in the exhaust gas that is flowing in (i.e., when the air-fuel ratio of the exhaust gas turns into a lean air-fuel ratio), oxygen adheres in the form of $O_2^-$ or $O^{2-}$ onto platinum Pt, whereby $NO_X$ in the exhaust gas reacts with $O_2^-$ or $O^{2-}$ on platinum Pt thereby to form $NO_2$. $NO_2$ in the exhaust gas and $NO_2$ thus formed are further oxidized on platinum Pt, absorbed by the absorbing agent in which they are bonded to barium oxide BaO and are diffused in the form of nitric acid ions $NO_3^-$ in the absorbing agent. In a lean atmosphere, therefore, $NO_X$ in the exhaust gas is absorbed in the form of nitrates by the $NO_X$ absorbing agent.

When the concentration of oxygen greatly decreases in the exhaust gas that is flowing in (i.e., when the air-fuel ratio of the exhaust gas becomes smaller (more rich) than the stoichiometric air-fuel ratio), $NO_2$ forms in a decreased amount on platinum Pt, and the reaction proceeds in the reverse direction permitting nitric acid ions $NO_3^-$ in the absorbing agent to be released in the form of $NO_2$ from the absorbing agent. In this case, the reducing components such as CO and the like and the components such as HC, $CO_2$ and the like in the exhaust gas work to reduce $NO_2$ on platinum Pt.

In this embodiment, the engine 1 is normally operated at a lean air-fuel ratio in most of the load regions except the high-load operation, and the $NO_X$ occluding and reducing catalyst absorbs $NO_X$ in the exhaust gas that flows in. When the engine 1 is operated at a rich air-fuel ratio, the $NO_X$ occluding and reducing catalyst 7 releases and purifies the absorbed $NO_X$ by reduction. When the $NO_X$ is absorbed in increased amounts by the $NO_X$ occluding and reducing catalyst 7 during the operation at a lean air-fuel ratio, therefore, a rich-spike operation is carried out to change the air-fuel ratio of the engine from a lean air-fuel ratio to a rich air-fuel ratio for a short period of time in order to release $NO_X$ from the $NO_X$ occluding and reducing catalyst and to purify $NO_X$ by reduction (to regenerate the $NO_X$ occluding and reducing catalyst).

However, it has been known that when the rich-spike operation is effected for the engine 1, the unpurified $NO_X$ is released from the $NO_X$ occluding and reducing catalyst immediately after the lean air-fuel ratio is changed over to the rich air-fuel ratio. This is attributed to the components HC and CO becoming in short supply in the exhaust gas when the engine is changed from the lean air-fuel ratio operation over to the rich air-fuel ratio operation. That is, the air-fuel ratio in the exhaust gas continuously changes when it is changed from the lean side over to the rich side. At this moment, though the air-fuel ratio may be rich, the degree of richness is not very high, and a region where the amount of the HC and CO in the exhaust gas is relatively small must be passed through. In this region where the HC and CO components are in short supply in the exhaust gas, therefore, it is not considered that the $NO_X$ released from the $NO_X$ occluding and reducing catalyst is all reduced.

In this embodiment, therefore, when the $NO_X$ is to be released from the $NO_X$ occluding and reducing catalyst, the secondary fuel is injected during the expansion or the exhaust stroke after the main fuel injection in order to quickly change the air-fuel ratio of the exhaust gas to a considerably rich air-fuel ratio, so that the unpurified $NO_X$ will not be released from the $NO_X$ occluding and reducing catalyst. After the main fuel injected into the cylinder has burned, the fuel is injected in the expansion or the exhaust stroke and remains unburned and comes in contact with the burned gas of a high temperature, and is vaporized to form hydrocarbons of low molecular weights. Besides, the fuel supplied by the secondary fuel injection does not contribute to the combustion in the cylinder. Therefore, even when the fuel is supplied in a relatively large amount by the secondary fuel injection, the output torque of the engine does not increase. When the secondary fuel is injected when the $NO_X$ is to be released from the $NO_X$ occluding and reducing catalyst, therefore, the air-fuel ratio of the exhaust gas can be quickly changed down to a low value without causing a change in the output torque of the engine. It is therefore possible to supply the exhaust gas having a high rich degree to the $NO_X$ occluding and reducing catalyst without passing through a region of intermediate air-fuel ratios. This prevents the release of unpurified $NO_X$ from the $NO_X$ occluding and reducing catalyst in the early period of the $NO_X$ releasing action. The $NO_X$ may be released from the $NO_X$ occluding and reducing catalyst relying on the secondary fuel injection only or by effecting the secondary fuel injection at the initial period only of the rich-spike operation at the time of conducting the normal rich-spike operation by increasing the amount of main fuel injection thereby to quickly change the air-fuel ratio of the exhaust gas to a rich air-fuel ratio.

However, when the fuel supplied by the secondary fuel injection partly remains in the cylinder, there may occur a change in the output torque of the engine. As described above, the ECU 30 calculates the required amount of fuel based on the engine load conditions (degree of accelerator opening, rotational speed) and supplies the fuel into the cylinder by the main fuel injection. When the fuel due to the secondary fuel injection remains in the cylinders, therefore, this remaining fuel burns in the cylinders in addition to the fuel supplied by the main fuel injection of the next cycle; i.e., the output torque of the engine increases due to the combustion of the fuel of an amount larger than the required amount, and the torque changes.

According to the present invention, this problem is solved by the below-mentioned two methods.

(A) The fuel supplied by the secondary fuel injection is all discharged out of the cylinder during the exhaust stroke (while the exhaust valve is opening), so that no fuel is left.

(B) When the fuel remains, the amount of injecting the main fuel in the next time is corrected (decreased) by the remaining amount of fuel, so that the amount of fuel that contributes to the combustion comes into agreement with a target amount of main fuel injection.

Described below are the embodiments of when these methods are employed.

(1) First Embodiment

In this embodiment, the fuel supplied by the secondary fuel injection is all discharged out of the cylinder during the exhaust stroke, in order to prevent a change in the output torque of the engine caused by the secondary fuel injection.

Figure 2:
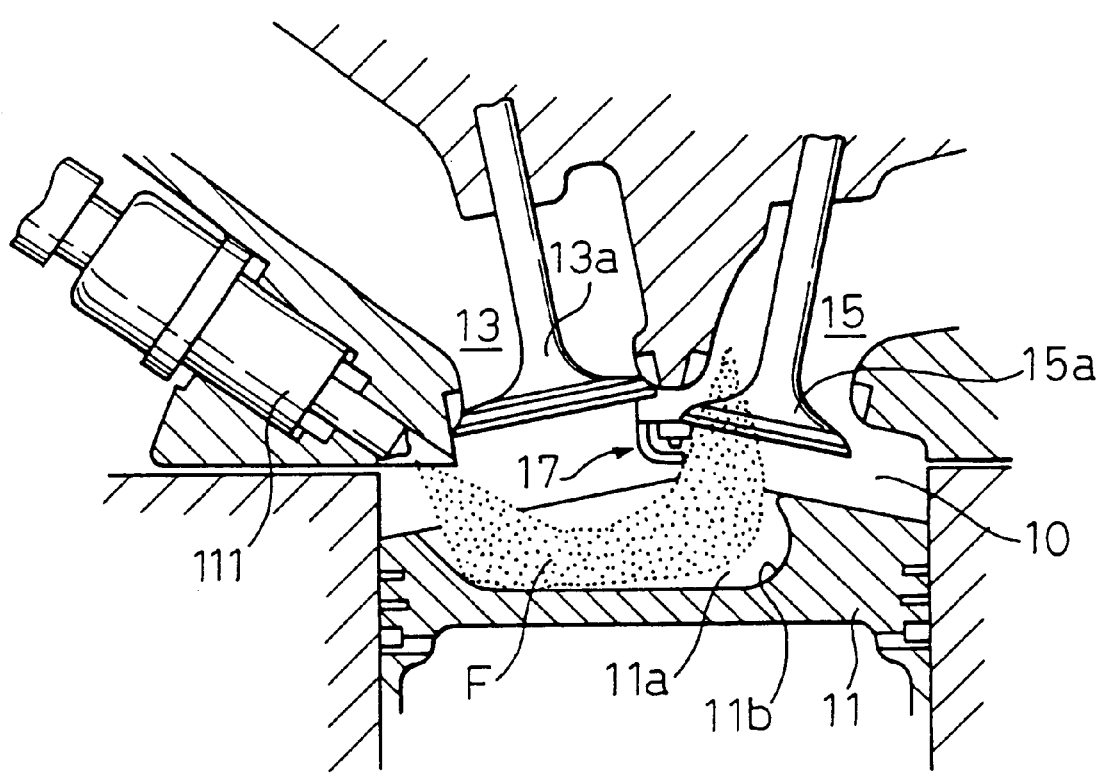
FIG. 2 is a vertical sectional view of a cylinder for illustrating a first embodiment of the present invention.

In FIG. 2, reference numeral 10 denotes a cylinder combustion chamber, 11 denotes a piston, 13 denotes an intake port, 13a denotes an intake valve, 15 denotes an exhaust port, and 15a denotes an exhaust valve. Further, reference numeral 111 denotes a direct cylinder fuel injection valve, and 17 denotes a spark plug provided at a central portion in the cylinder head. In this embodiment, a recessed piston cavity 11a is formed in the top surface of the piston 11. The cavity 11a works to concentrate the fuel injected from the fuel injection valve 111 in the latter half of the compression stroke during the operation at a lean air-fuel ratio, to the vicinity of the spark plug 17 to form a charge of a mixture of a combustible air-fuel ratio near the plug 17. That is, in the main fuel injection for the above-mentioned ① lean air-fuel ratio stratified charge combustion (fuel is injected in the compression stroke) and ② lean air-fuel ratio uniform mixture/stratified charge combustion (fuel is injected in the suction stroke and in the compression stroke), the fuel having a relatively strong piercing force (having a high injection pressure) is injected from the direct cylinder fuel injection valve 111 toward the piston cavity 11a at a moment when the piston arrives at a sufficiently elevated position in the latter half of the compression stroke.

At this moment, the injected fuel arrives at the surface of the piston cavity 11a and flows along the curved surface of the cavity 11a. The cavity 11a has a side surface 11b having a relatively small radius of curvature on the side remote from the fuel injection valve 111, so that the fuel flowing along the surface of the cavity 11a is deflected toward the vicinity of the spark plug 17. Accordingly, the fuel injected from the fuel injection valve 111 forms a stratified charge near the spark plug 17.

In this embodiment, all the fuel supplied by the secondary fuel injection is discharged through the exhaust port 15 by utilizing the piston cavity 11a. That is, in this embodiment, the timing for injecting the fuel is set at a point delayed by 360 degrees in terms of the crank angle behind the timing for injecting the main fuel. When the secondary fuel is injected, therefore, the piston 11 is assuming the same position as when the main fuel is injected (hereinafter referred to as "fuel injection in the compression stroke") for forming the stratified charge of the mixture. Accordingly, the fuel supplied by the secondary fuel injection is deflected along the curved surface 11b in the same manner as the main fuel injection and flows toward the vicinity of the spark plug 17 (i.e., toward the exhaust port 13). Here, the exhaust valve 15a is opening in the latter half of the exhaust stroke, and the deflected secondary fuel does not form a stratified charge about the spark plug 17 as designated at F in FIG. 2, and is all discharged out of the cylinder through the exhaust port 15. Therefore, the secondary fuel does not remain in the cylinder. Here, the injected fuel comes in contact with the surface of the piston cavity 11a. However, the piston which is in operation is heated at a high temperature, and the fuel that comes in contact with the surface of the cavity 11a is readily vaporized, and does not adhere or remain on the surface of the cavity 11a.

In order to discharge all fuel supplied by the secondary fuel injection out of the cylinder, the fuel must have been entirely discharged through the exhaust port 15 before the intake valve 13a starts opening in the exhaust stroke. If the fuel remains in the cylinder during a period in which both the exhaust valve 15a and the intake valve 13a are opening (valve overlapping period), the fuel partly flows in a reverse direction toward the intake port and flows again into the cylinder in the next suction stroke; i.e., the secondary fuel may partly remain in the cylinder. The engine 1 of this embodiment is equipped with a variable valve timing device 200, and the valve timing varies based on the engine load conditions. According to this embodiment, therefore, the intake valve opening timing is read when the secondary fuel injection is executed, and the amount of the secondary fuel injection is changed relying on the intake valve opening timing, so that the fuel supplied by the secondary fuel injection will not reversely flow toward the intake port and will not remain in the cylinder.

Figure 3:
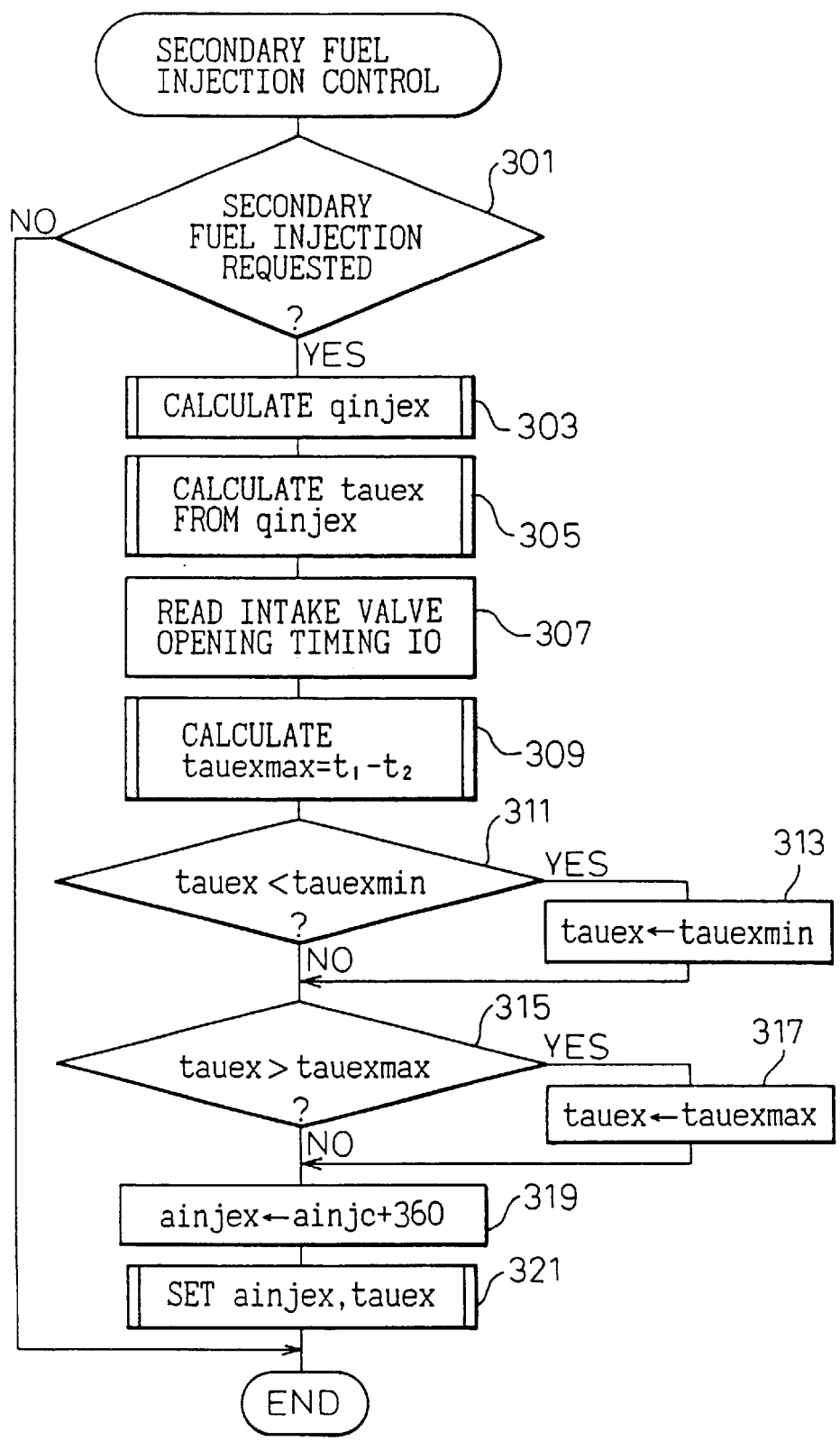
FIG. 3 is a flow chart illustrating the operation for controlling the secondary fuel injection according to the first embodiment.

FIG. 3 is a flow chart illustrating the operation for controlling the fuel injection according to the embodiment. This operation is conducted by a routine executed by the ECU 30 at every predetermined crankshaft rotation angle.

When the operation starts in FIG. 3, it is judged at a step 301 whether the secondary fuel injection is requested. In this embodiment, the amount of $NO_X$ absorbed by the $NO_X$ occluding and reducing catalyst 7 is estimated based on the engine operating conditions by using a routine (not shown) that is separately executed. When the absorbed amount of $NO_X$ has reached a predetermined value, the secondary fuel injection (rich spike) is requested. Instead of estimating the absorbed amount of $NO_X$, it may be so presumed that the amount of $NO_X$ absorbed by the $NO_X$ occluding and reducing catalyst has reached a predetermined value when a predetermined period of time has lapsed from the last execution of the $NO_X$ releasing operation or when the integrated value of the number of revolutions of the engine has reached a predetermined value from the last execution of the $NO_X$ releasing operation of the previous time, and the secondary fuel injection may be requested.

When the secondary fuel injection is not requested at the step 301, the operation immediately ends without executing the steps 303 through 321, and the secondary fuel is not injected. When the secondary fuel injection is requested at the step 301, on the other hand, the step 303 is executed to calculate a target value qinjex of the amount of the secondary fuel injection. At the step 303, the secondary fuel injection amount qinjex necessary for obtaining a desired air-fuel ratio is calculated from the amount of the air Q taken in by the cylinder per a revolution of the engine 1 and from the amount of main fuel injection. In this embodiment, the rotational speed N of the engine, load (degree of accelerator opening) ACCP, and the amount of the air Q taken in by the cylinder per a revolution of the engine are measured in advance under various operating conditions to find a relationship among Q, N and ACCP. Based on these measured results, the values of the amount of the air Q taken in by the cylinder were stored in the ROM of the ECU 30 in the form of a numerical value table using N and ACCP as parameters. Likewise, the amounts of main fuel injection were stored in the ROM of the ECU 30 as a numerical value table of N and ACCP. At the step 303, therefore, the amount of the air Q taken in and the amount of main fuel injection are calculated from these numerical tables using the present load conditions (N, ACCP), thereby to calculate the secondary fuel injection amount qinjex necessary for bringing the air-fuel ratio of the exhaust gas to a target value.

The secondary fuel injection amount qinjex (milliliters) that is calculated is then converted at a step 305 into a fuel injection time (fuel injection valve opening time) tauex (milliseconds) by using a fuel pressure in the common rail 110 and a characteristic value of the direct cylinder fuel injection valve.

At a step 307, the intake valve opening timing (crank angle) IO currently set by the variable valve timing device 200 is read and at a step 309, a maximum secondary fuel injection time (guard value) tauexmax that can now be permitted is calculated.

In this embodiment as described above, the fuel supplied by the secondary fuel injection from the fuel injection valve must all be discharged out of the cylinder before the intake valve opens. In this embodiment, further, the timing for injecting the secondary fuel has been fixed (delayed by 360 degrees behind the injection timing in the compression stroke). In order to discharge all the injected fuel out of the cylinder before the intake valve opens, therefore, a maximum amount of fuel injection must be limited. At the step 309, the time $t_1$ (milliseconds) is calculated from the start of fuel injection to the opening of intake valve by using the present rotational speed N of the engine and a difference between the intake valve opening crank angle IO read at the step 307 and the secondary fuel injection start crank angle ainjc +360 (ainjc is a timing for injecting the main fuel in the compression stroke). In order for the fuel injected in the last stage of the secondary fuel injection to be discharged through the exhaust port, further, a time $t_2$ is required for the fuel to move from the fuel injection valve to the exhaust port. Here, $t_2$ is determined by the pressure in the common rail 110. In this embodiment, therefore, the fuel may remain in the cylinder unless the injection of fuel from the fuel injecton valve is finished within a time ($t_1-t_2$) after the start of the fuel injection. At the step 309, therefore, the times $t_1$ and $t_2$ are calculated by using the intake valve opening crank angle IO, rotational speed N of the engine and fuel pressure in the common rail, and a maximum fuel injection time tauexmax is calculated as tauexmax=$t_1-t_2$.

Then, at steps 311 to 317, the target secondary fuel injection time tauex set at the step 305 is limited by a maximum value tauexmax and a minimum value taumin thereby to set a value tauex to lie within a range taumin≦tauex≦tauexmax. The minimum value tauemin is a minimum controllable valve opening time of the fuel injection valve 111 and is a characteristic value of the fuel injection valve 111.

At a step 319, the secondary fuel injection start timing ainjex is set to be ainjex =ainjc+360 and at a step 321, ainjex and tauex are set to a fuel injection circuit (not shown). Then, the secondary fuel injection starts at a crank angle ainjex and continues for a time tauex.

According to this embodiment as described above, the fuel supplied by the secondary fuel injection is deflected toward the exhaust port 13 by utilizing the piston cavity 11a, and the amount of fuel injection is controlled based on the engine load conditions and the valve timing, so that the fuel supplied by the secondary fuel injection is all discharged out of the cylinder during the exhaust stroke.

In the embodiment of FIG. 2, the flow of fuel supplied by the secondary fuel injection is deflected toward the exhaust port by the cavity 11a formed in the top surface of the piston. However, the flow of fuel may be deflected toward the exhaust port by using other means.

For example, the fuel injection valve may be constituted as an air assist valve that injects the compressed air together with the fuel, and the compressed air may be injected toward the exhaust port only at the time of the secondary fuel injection, so that the injected fuel is deflected toward the exhaust port while being assisted by the air.

When the fuel injection valve is so constructed as to change the direction of injection depending on the main fuel injection and the secondary fuel injection, the direction of fuel injection may be changed toward the exhaust port or toward the deflecting flow that is headed to the exhaust port at the time when the secondary fuel is injected.

In the embodiment of FIG. 2, the main fuel injection and the secondary fuel injection are effected using the same fuel injection valve. It is, however, also allowable to provide an auxiliary fuel injection valve exclusively for the secondary fuel injection separately from the fuel injection valve for main fuel injection, and the direction of injection of the auxiliary fuel injection valve may be set being pointed to the exhaust port.

Instead of the piston cavity, there may be provided a deflecting plate that protrudes into the cylinder at the time of the secondary fuel injection only, and the flow of fuel supplied by the secondary fuel injection may be brought into collision with the deflecting plate so as to be headed toward the exhaust port.

(2) Second Embodiment

Next, a second embodiment of the invention will be described. In this embodiment also, the fuel supplied by the secondary fuel injection is all discharged out of the cylinder during the exhaust stroke to prevent a change in the output torque of the engine caused by the secondary fuel injection, as in the above-mentioned first embodiment.

Figure 4:
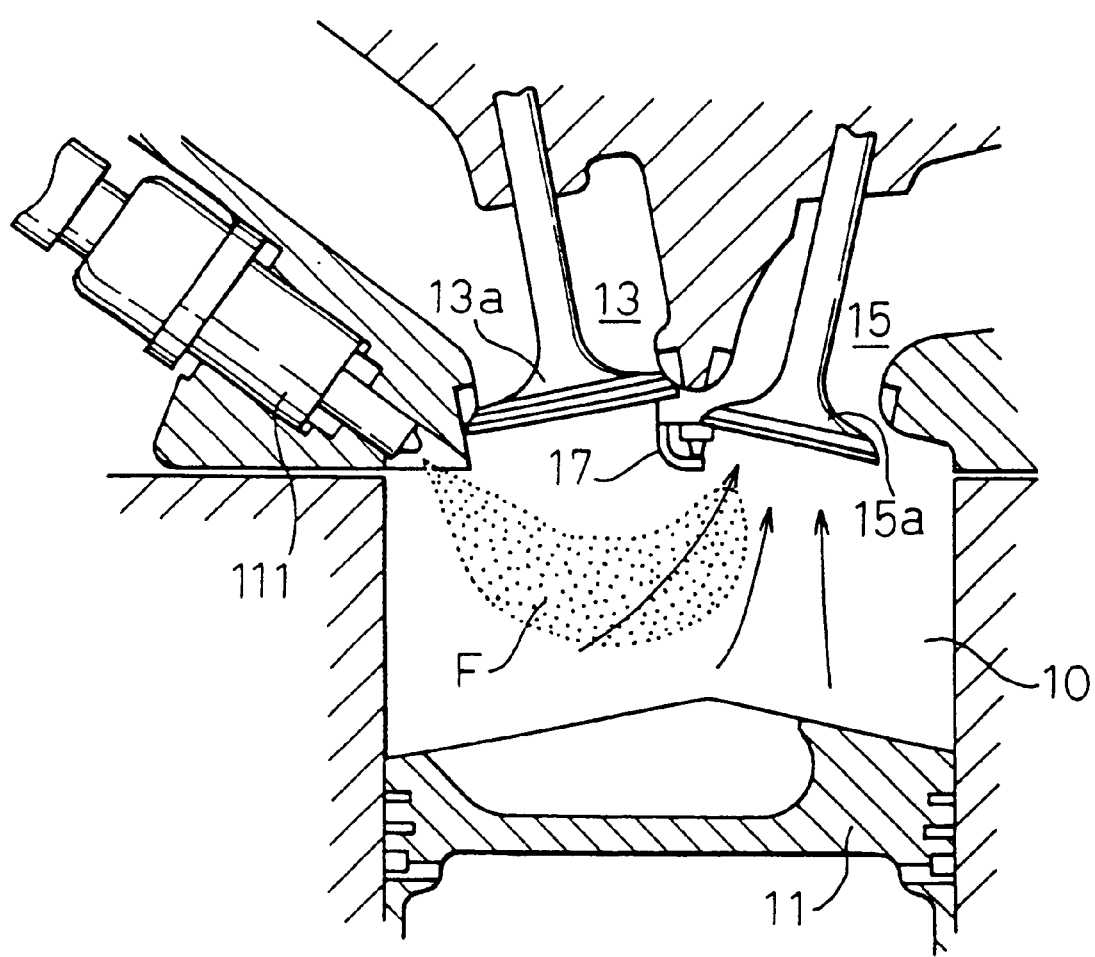
FIG. 4 is a vertical sectional view of a cylinder for illustrating a second embodiment of the present invention.

FIG. 4 is a sectional view of the cylinder of the engine 1 and is similar to FIG. 2. In FIG. 4, reference numerals same as those of FIG. 2 denote the elements same as those of FIG. 2.

In this embodiment, the secondary fuel injection is effected at an early timing in the exhaust stroke in which the piston is located at a position close to the bottom dead center, and the pressure for the secondary fuel injection (common rail pressure) is set to be lower than the pressure for the main fuel injection. At an early timing in the exhaust stroke, the burned gas is produced a high pressure in the cylinder, and a relatively strong exhaust flow is produced in the cylinder and moves toward the exhaust port as indicated by arrows in FIG. 4. If the secondary fuel is injected with a relatively low pressure at this early timing, then, the injected fuel does not arrive at the cylinder wall or the piston piercing through the exhaust flow in the cylinder but rides on the exhaust flow near the center of the cylinder and is conveyed to the exhaust port as designated at F in FIG. 4. Accordingly, the injected fuel does not adhere to the cylinder wall, piston or cylinder head; i.e., the fuel supplied by the secondary fuel injection is all discharged out of the cylinder during the exhaust stroke and does not remain in the cylinder.

In the above-mentioned embodiment, the amount of secondary fuel injection is controlled based on the engine operating conditions (load conditions) and the valve timings in order to discharge all fuel supplied by the secondary fuel injection out of the cylinder before the intake valve is opened. In this embodiment, however, the timing of the secondary fuel injection plays an important role. That is, as the fuel injection timing is delayed, the fuel that is injected may partly flow reversely toward the intake port. When the fuel injection timing is too early, on the other hand, the injected fuel is diffused in the cylinder and may not all be discharged out of the cylinder riding on the exhaust flow. Next, described below is the operation for controlling the fuel injection timing according to this embodiment.

Figure 5:
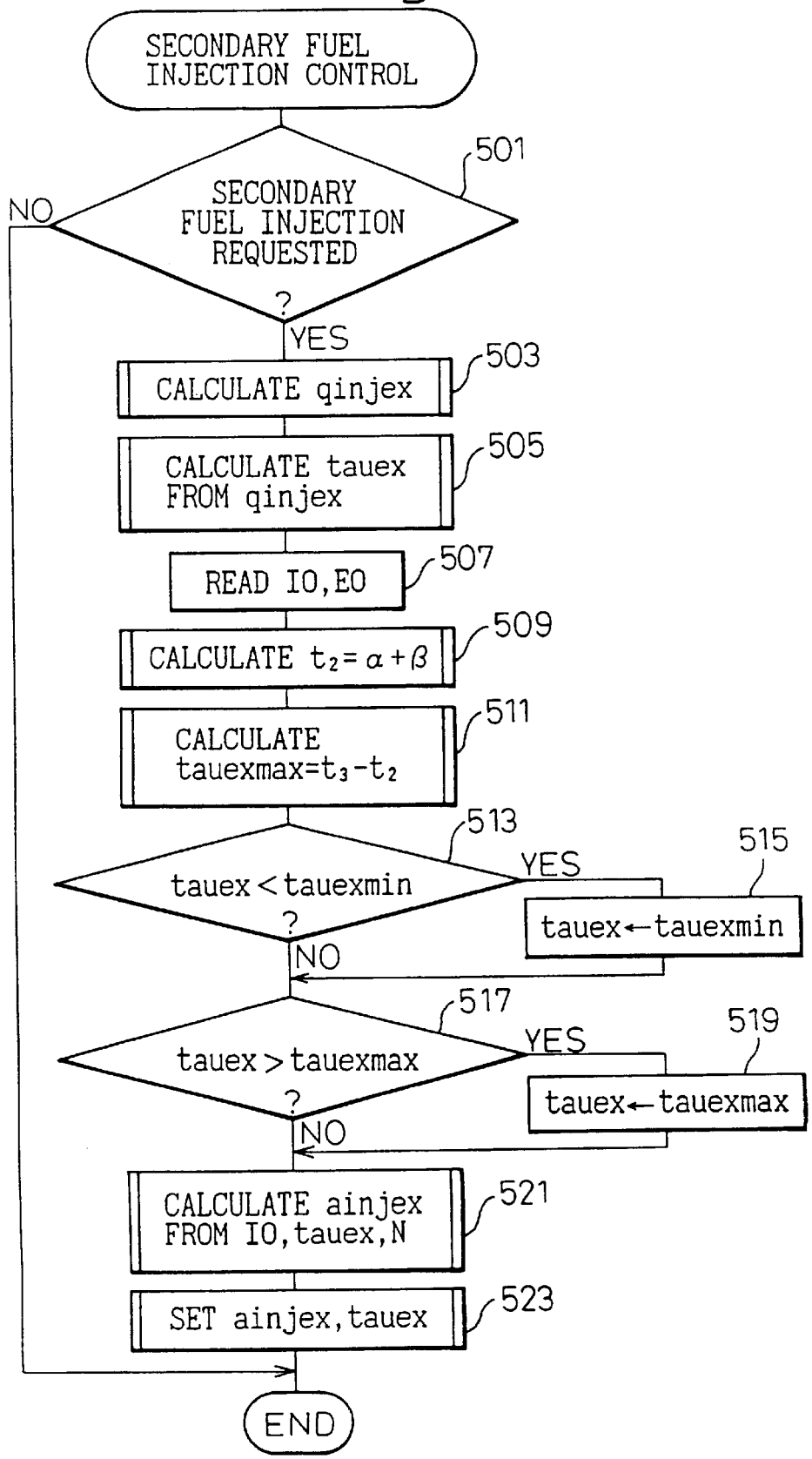
FIG. 5 is a flow chart illustrating the operation for controlling the secondary fuel injection according to the second embodiment.

FIG. 5 is a flow chart illustrating the operation for controlling the fuel injection according to the embodiment. This operation is conducted by a routine executed by the ECU 30 at every predetermined crankshaft rotation angle.

When the operation starts in FIG. 5, it is judged at a step 501 whether the secondary fuel injection is requested. At a step 503, a target value qinjex of the secondary fuel injection amount is calculated and at a step 505, the injection time tauex is calculated from the target injection amount qinjex. The target injection amount qinjex at the step 503 and the injection time tauex at the step 505 are calculated by the same methods as those of the steps 303 and 305 in FIG. 3. In this embodiment, however, the pressure in the common rail 110 for the secondary fuel injection is controlled to be smaller than the pressure for the main fuel injection. Even when the target injection amount qinjex is the same as the case of FIG. 3, therefore, the injection time tauex becomes longer than that of the case of FIG. 3.

After qinjex and tauex are calculated in this embodiment, the present intake valve opening timing (crank angle) IO and the exhaust valve opening timing (crank angle) EO are read at a step 507, and, at a step 509, a flying time $t_2$ of the fuel from when it is injected from the fuel injection valve 111 until it is discharged through the exhaust port is calculated as $t_2 = \alpha + \beta$. Here, a is the time required by the fuel from when it is injected through the fuel injection valve 1112 until when it arrives at the central portion of the cylinder, and varies in proportion to the pressure in the common rail 110 (fuel injection pressure), and $\beta$ is the time required by the fuel from when it has arrived at the central portion until when it is discharged through the exhaust port riding on the exhaust flow, and varies in proportion to the rotational speed N of the engine.

After the flying time $t_2$ is calculated at the step 509, a maximum value (guard value) tauexmax of the secondary fuel injection time is calculated at a step 511 as tauexmax= $t_3 - t_2$.

Here, $t_3$ is the time from when the exhaust valve is opened until when the intake valve is opened, and is calculated by using the valve opening timings IO, EO of the intake and exhaust valves read at the step 507 and by using the rotational speed N of the engine. That is, tauexmax is an injection time corresponding to a maximum fuel injection amount that can be all discharged out of the cylinder without reversely flowing into the intake port when the secondary fuel is injected simultaneously with the opening of the discharge valve.

After tauexmax is calculated at the step 511, the target injection time tauex calculated at the step 505 is limited at the steps 513 to 517 by the maximum value tauexmax and the minimum value taumin. At a step 521, the secondary fuel injection start timing ainjex is calculated based on the intake valve opening timing IO, rotational speed N of the engine and the value of tauex after being limited. That is, the secondary fuel injection starts before the intake valve starts opening by the amount of time (tauex+$t_2$), i.e., starts at a timing at which the fuel injected at the end of the secondary fuel injection can be discharged through the exhaust port just before the intake valve opens. That is, in this embodiment, the secondary fuel injection timing is advanced with an increase in the amount of the secondary fuel injection. Therefore, the fuel supplied by the secondary fuel injection all arrives at the exhaust port before the intake valve opens, and is also prevented from diffusing in the cylinder, caused by the secondary fuel injection timing being too early.

Figure 6:
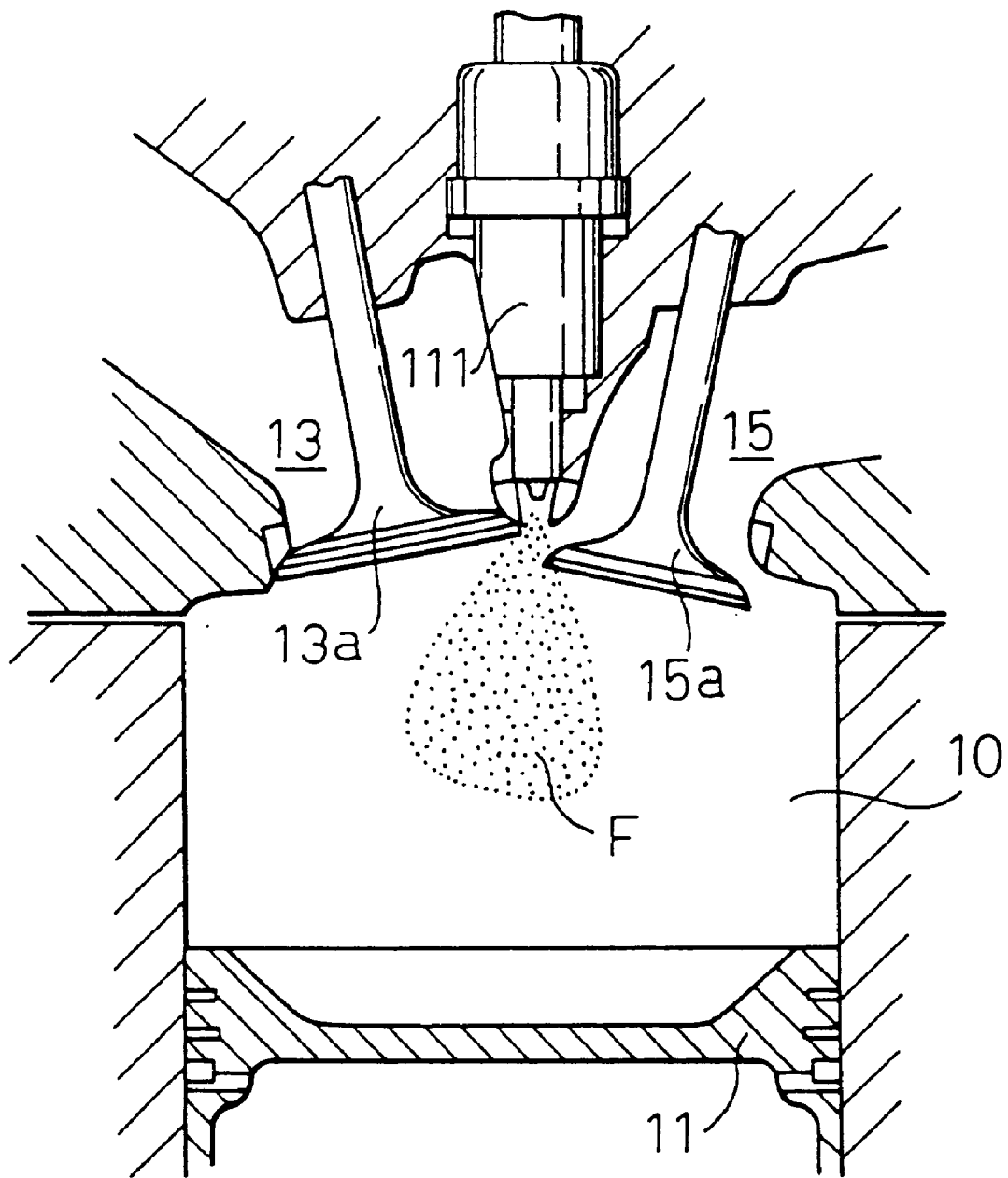
FIG. 6 is a diagram similar to FIG. 4 and illustrates a modified example of the second embodiment.

In the above-mentioned second embodiment, the direction of fuel injection by the direct cylinder fuel injection valve 111 is the same as that of the embodiment of FIG. 2. As shown in FIG. 6, however, the direct cylinder fuel injection valve may be provided being directed downward at the central portion of the cylinder head. At the time of the secondary fuel injection, the fuel is injected with a low pressure toward the central portion of the cylinder, which is more effective for preventing the fuel from remaining in the cylinder.

(3) Third Embodiment

Described below is a third embodiment of the present invention. In this embodiment, the amount of main fuel injection is corrected based on a prerequisite that the fuel supplied by the secondary fuel injection partly remains in the cylinder. That is, in this embodiment, the amount of fuel remaining in the cylinder due to the secondary fuel injection is calculated from the engine operating conditions, and the amount of main fuel injection in the next time is decreased by the remaining amount of fuel. Thus, the amount of fuel that contributes to the combustion in the cylinder due to the main fuel injection comes into correct agreement with the target amount of main fuel injection. Even when the fuel remains due to the secondary fuel injection, therefore, the change in the output torque of the engine does not occur.

First, described below is the method of calculating the remaining amount of fuel due to the secondary fuel injection according to this embodiment.

Figure 7:
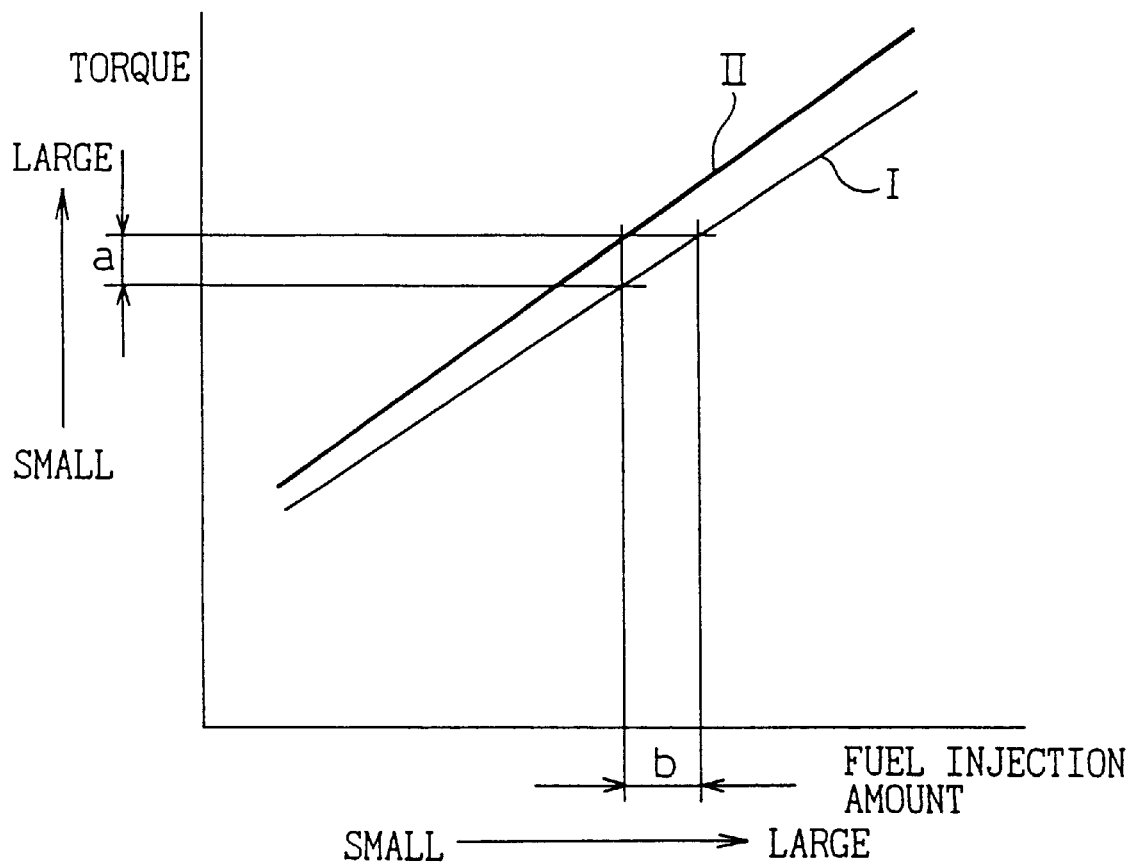
FIG. 7 is a diagram illustrating a method of calculating the remaining amount of fuel according to a third embodiment of the present invention.

FIG. 7 is a graph illustrating a relationship between the output torque of the engine (ordinate) and the amount of main fuel injection (abscissa) of when the engine is operated at a predetermined rotational speed. In FIG. 7, a curve I represents a relationship between the output torque and the amount of main fuel injection when the main fuel only is injected without injecting the secondary fuel, and a curve II represents a relationship between the output torque and the amount of main fuel injection when the secondary fuel is injected in addition to the main fuel injection. As described earlier, the amount of the secondary fuel injection has been determined in a manner that the air-fuel ratio of the exhaust gas becomes a target air-fuel ratio in their respective cases, and is determined based on the load on the engine (main fuel injection) and the rotational speed. In this case, further, the timing for the secondary fuel injection may be set by any one of the above-mentioned methods or may be fixed to a predetermined suitable crank angle.

As described earlier, when the fuel due to the secondary fuel injection does not remain in the cylinder, the output torque of the engine remains the same irrespective of whether the secondary fuel is injected. When the fuel remains in the cylinder due to the secondary fuel injection, however, the output torque of the engine increases by an amount corresponding to the amount of the remaining fuel (curve II in FIG. 7).

It is now presumed that the output torque has increased with a given amount of main fuel injection due to the injection of the secondary fuel as represented by a in FIG. 7. It is further presumed that the amount of increase in the output torque is equal to an increase in the amount of main fuel injection by an amount represented by b in FIG. 7. In this case, the increase in the output torque is caused by the combustion of the fuel remaining in the cylinder due to the secondary fuel injection. Therefore, the amount of the remaining fuel will become equal to the amount of main fuel injection necessary for increasing the output torque, i.e., will become equal to the amount of fuel denoted by b in FIG. 7. In this embodiment, therefore, when an increase in the output torque due to the secondary fuel injection is as denoted by a in FIG. 7, the remaining amount of fuel is estimated presuming that the amount represented by b in FIG. 7 is equal to the amount of fuel remaining in the cylinder.

According to this embodiment, curves corresponding to those of FIG. 7 are prepared in advance through experiment for every combination of the rotational speeds of the engine and the fuel injection modes ① to ⑤ described below, and the amount of the remaining fuel (b in FIG. 7) is calculated in each of the main fuel injection amounts. The amounts of the remaining fuel b are prepared in the form of a numerical value table using the engine rotational speed N and the main fuel injection amount (qinj=qinjei+qinjec) as parameters for each of the fuel injection modes, and are stored in the ROM of the ECU 30. When the engine is in operation, the ECU 30 calculates the amount of fuel remaining in the cylinder when the secondary fuel is injected based on the engine rotational speed N and the main fuel injection amount qinj. Here, qinjei is the amount of the first main fuel injection during the suction stroke, qinjec is the amount of the second main fuel injection in the compression stroke, and qinj is the sum of the two.

In this embodiment, the engine 1 is also operated in the below-mentioned five kinds of fuel injection modes.

① A lean air-fuel ratio stratified charge combustion (fuel is injected in the compression stroke).

② A lean air-fuel ratio uniform mixture/stratified charge combustion (fuel is injected in the suction stroke and in the compression stroke).

③ A lean air-fuel ratio uniform mixture/stratified charge combustion (fuel is injected in the suction stroke).

④ A stoichiometric air-fuel ratio uniform mixture combustion (fuel is injected in the suction stroke).

⑤ A rich air-fuel ratio uniform mixture combustion (fuel is injected in the suction stroke).

In this embodiment, when the mode ② (fuel is injected in the suction stroke and in the compression stroke) is selected, the correction is effected by decreasing the amount of fuel injection in the suction stroke by the remaining amount of fuel. The remaining fuel diffuses in the cylinder to become part of the uniform mixture and, hence, directly affects the air-fuel ratio of the uniform mixture formed in the cylinder. In order to prevent this, the amount of the fuel injection in the suction stroke for forming the uniform mixture is decreased by the remaining amount of fuel, so that the air-fuel ratio of the uniform mixture actually formed is maintained at a target value.

Figure 8:
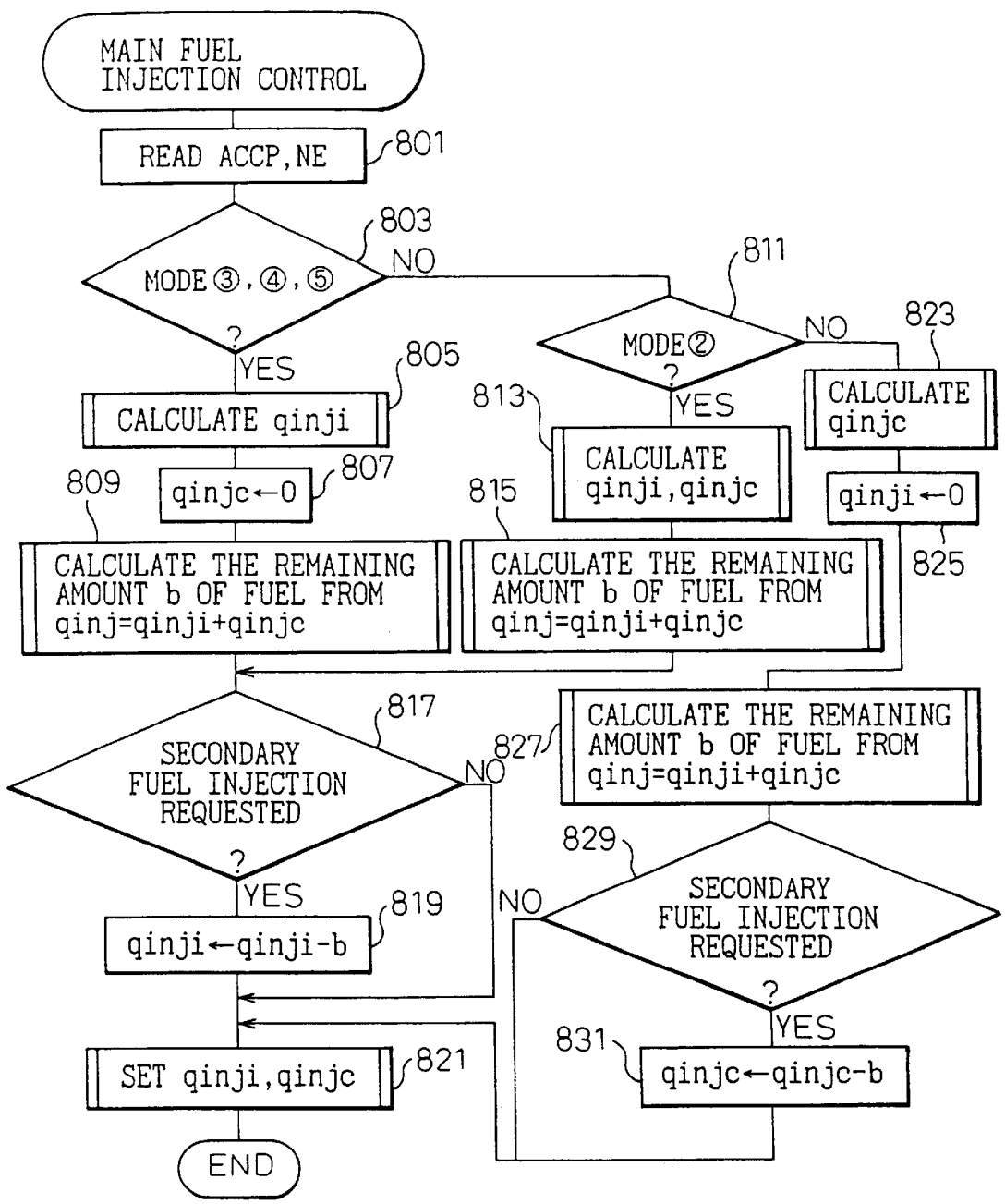
FIG. 8 is a flow chart illustrating the operation for controlling the main fuel injection according to the third embodiment.

FIG. 8 is a flow chart illustrating the operation for controlling the main fuel injection according to the embodiment. This operation is executed at every predetermined crankshaft rotation angle of the engine.

In FIG. 8, when the operation starts, the engine load (degree of accelerator opening) ACCP and the rotational speed N are read at a step 801. At steps 803, 811 and 823, it is determined which of the fuel injection modes ① to ④ shall be employed based on the degree of accelerator opening ACCP and the rotational speed N.

At the step 803, it is determined from ACCP and N whether one of the fuel injection mode of ③ lean air-fuel ratio uniform mixture combustion (fuel is injected in the suction stroke), ④ stoichiometric air-fuel ratio uniform mixture combustion (fuel is injected in the suction stroke), or ⑤ rich air-fuel ratio uniform mixture combustion (fuel is injected in the suction stroke) is employed. When the mode ③ or ④, ⑤ is employed, the suction stroke fuel injection amount qinjei is calculated at the step 805 based on ACCP and N from the numerical value table that has been stored in advance in the ROM of ECU 30. At a step 807, the compression stroke fuel injection amount qinjec is set to 0.

Then, at a step 809, the sum qinj of qinjei and qinjec is calculated, and the amount b of fuel remaining in the cylinder when the secondary fuel is injected is calculated from the relationship of FIG. 7 in the fuel injection mode ③ or ④ based on the rotational speed N and the amount of main fuel injection qinj. At a step 817, it is judged whether the secondary fuel injection is now requested. When the secondary fuel injection is requested, the operation proceeds to a step 819 where the suction stroke fuel injection amount qinjei is decreased by the remaining amount b of fuel and at a step 821, the suction stroke fuel injection amount qinjei after corrected and the compression stroke fuel injection amount qinjec (quinjec=0 in this case) are set to the fuel injection circuit before terminating the operation. When the secondary fuel is injected, therefore, the amount of main fuel is decreased by an amount equal to the remaining amount b of fuel. Even when the secondary fuel is injected, therefore, the output torque of the engine is prevented from changing.

When none of the fuel injection mode ③, ④ or ⑤ is employed at the step 803, the routine proceeds to a step 811 where it is judged whether one of the fuel injection mode ② (lean air-fuel ratio uniform mixture/stratified charge combustion (fuel is injected in the suction stroke and in the compression stroke)) is employed. When the mode ② is employed, the suction stroke fuel injection amount qinjei and the compression stroke fuel injection amount qinjec are calculated at a step 813 from the numerical value table stored in advance in the ROM of ECU 30 based on ACCP and N. At a step 815, the remaining amount b of fuel due to the secondary fuel injection is calculated from the relationship of FIG. 7 in the mode ②, and the operations of the step 817 and subsequent steps are carried out. In this case, also the suction stroke fuel injection amount qinjei only is decreased by the remaining amount b of fuel, but the compression stroke fuel injection amount qinjec is not corrected.

When none of the fuel injection modes ② to ⑤ is employed at the steps 803 and 801, then, the fuel injection mode ① (lean air-fuel ratio stratified charge combustion (fuel is injected in the compression stroke)) is employed. In this case, the compression stroke fuel injection amount qinjec is calculated based on ACC and N at a step 823, and the suction stroke fuel injection amount qinjei is set to 0. In this case, also the remaining amount b of fuel due to the secondary fuel injection is calculated at the step 827 from the relationship of FIG. 7 in the mode ①, and it is judged at a step 829 whether the secondary fuel injection is requested. When the secondary fuel injection is requested at the step 829, the compression stroke fuel injection amount qinjec is decreased by the amount of the remaining fuel b at a step 831, and the operation of the step 821 is executed.

According to this embodiment as described above, the amount of main fuel injection is corrected based upon the remaining amount of fuel due to the secondary fuel injection, and the output torque of the engine is not changed by the secondary fuel injection. In effecting the correction in the mode ③ (fuel is injected in the suction stroke and in the compression stroke), further, the suction stroke fuel injection amount only is corrected, so that the air-fuel ratio of the uniform air-fuel ratio mixture is brought into agreement with the target value.

In this embodiment, the correction is effected for each cycle by using a relationship between the amount of main fuel injection and the amount of fuel remaining in the cylinder, that is found in advance through experiment. It is, however, also allowable to detect a change in the output torque of the engine (change represented by a in FIG. 7) caused by the fuel remaining in the cylinder from a change in the rotational speed of the engine or from a change in the combustion pressure in the cylinder, and calculate the amount b for correcting the amount of main fuel injection from the relationship of FIG. 7 based on the amount of change in the torque. In this case, the amount of main fuel injection is corrected in a cycle next of the cycle in which the change in the torque was detected.

The foregoing embodiments have dealt with the engine which changes over the fuel injection mode based on the engine operating conditions. However, it needs not be pointed out that the present invention can also be applied to the engine in which the fuel injection mode is fixed to the suction stroke fuel injection or the compression stroke fuel injection or to both of them (injected twice), as a matter of course.

Further, the foregoing embodiments have dealt with the case where the $NO_X$ occluding and reducing catalyst was disposed in the exhaust passage. However, it needs not be pointed out that the invention is in no way limited thereto only but can be applied to any case where the secondary fuel is injected. For example, when a selectively reducing catalyst is disposed in the exhaust passage to reduce the $NO_X$ by selectively reacting HC in the exhaust gas (or HC adsorbed by the catalyst) with $NO_X$ under the conditions of a lean air-fuel ratio, it is required to supply HC to the selectively reducing catalyst. The present invention can be applied even to the case where the HC is supplied to the selectively reducing catalyst by the secondary fuel injection.

(4) Fourth Embodiment

Next, described below is a fourth embodiment of the present invention.

Figure 9:
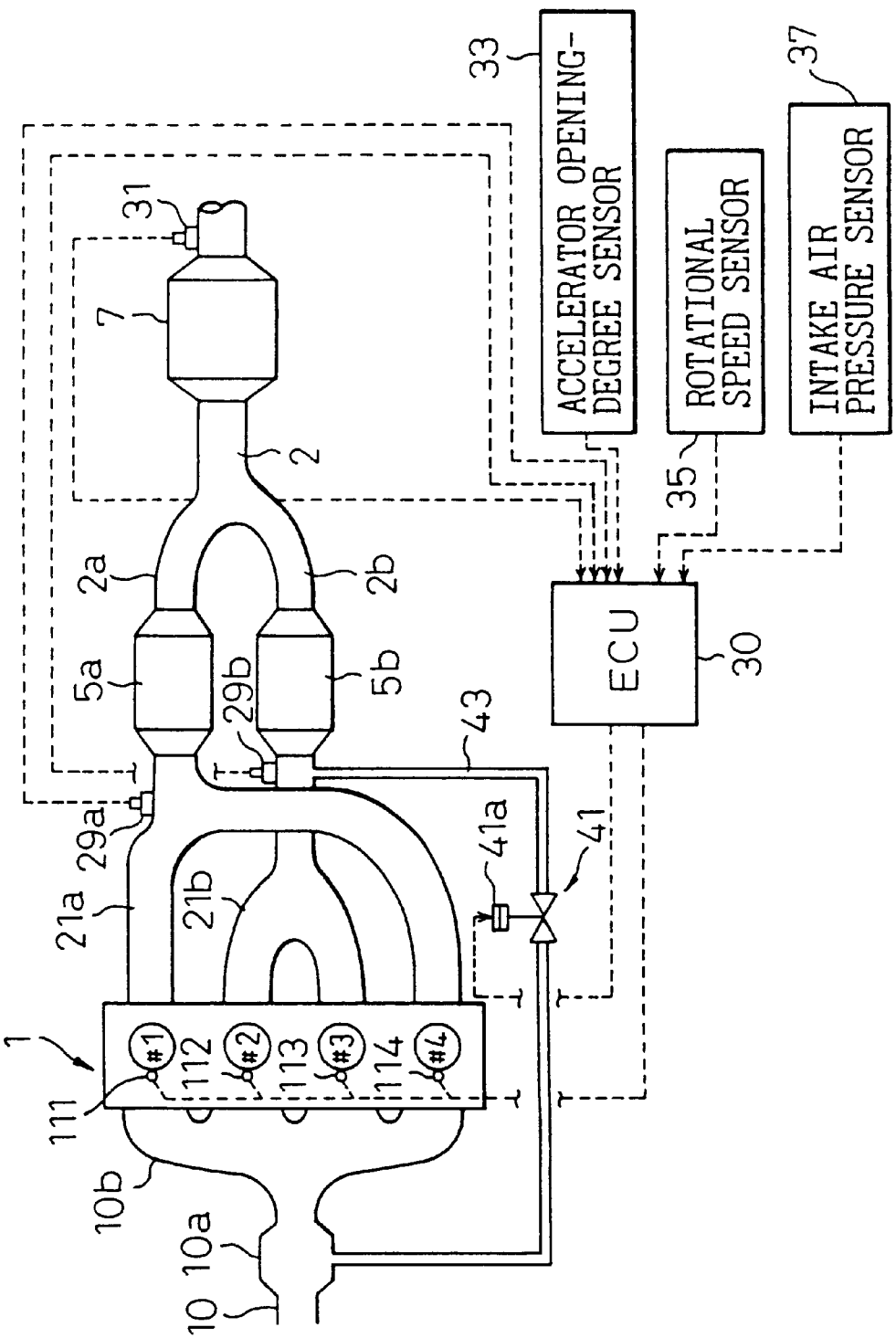
FIG. 9 is a diagram schematically illustrating the general construction of an embodiment when the present invention is applied to an internal combustion engine that executes the external EGR for automobiles.

FIG. 9 schematically illustrates the constitution of this embodiment and is similar to FIG. 1. In FIG. 9, reference numerals same as those of FIG. 1 denote the same elements.

The embodiment of FIG. 9 is different from the embodiment of FIG. 1 with respect to the provision of an exhaust gas recirculation device for recirculating part of the exhaust gas of the engine into the engine intake air system. Though not indicated in FIG. 9, the engine 1 in this embodiment, too, is equipped with the common rail 110, throttle valve 15, etc. like in the embodiment of FIG. 1.

In this embodiment as shown in FIG. 9, the upstream side of the SC 5*b* of the exhaust passage 2*b* of the cylinders #2 and #3 is connected to the surge tank 10*a* of the engine intake passage 10 through an EGR passage 43. Further, an EGR valve 41 comprising a flow rate control valve is provided in the EGR passage 43 to control the flow rate of the exhaust gas recirculating from the exhaust passage 2*b* to the intake passage 10 through the EGR passage. The EGR valve 41 is equipped with an actuator 41*a* of a suitable form such as step motor, negative-pressure actuator, etc. that operates in response to a control signal from the ECU 30, and determines its opening degree based on the control signal from the ECU 30.

In this embodiment, too, the ECU 30 changes the fuel injection mode of the direct cylinder injection valves 111 to 114 in the same manner as in the embodiment of FIG. 1, and operates the engine in any one of the below-mentioned five modes based on the engine operating conditions.

① A lean air-fuel ratio stratified charge combustion (fuel is injected in the compression stroke).

② A lean air-fuel ratio uniform mixture/stratified charge combustion (fuel is injected in the suction stroke and in the compression stroke).

③ A lean air-fuel ratio uniform mixture/stratified charge combustion (fuel is injected in the suction stroke).

④ A stoichiometric air-fuel ratio uniform mixture combustion (fuel is injected in the suction stroke).

⑤ A rich air-fuel ratio uniform mixture combustion (fuel is injected in the suction stroke).

In this embodiment, further, the ECU 30 controls the EGR valve 41 to recirculate part of the exhaust gas into the intake passage 10 from the exhaust passage 2b based on the engine operating conditions. In other words, this embodiment executes the external EGR. In order to control the amount of EGR, the output port of the ECU 30 is connected to the actuator 41a of the EGR valve through a drive circuit (not shown) to control the opening degree of the EGR valve 41.

In this embodiment, too, the ECU 30, as required, executes the secondary fuel injection from the direct cylinder fuel injection valves 111 to 114 into the respective cylinders during the expansion stroke or the exhaust stroke while the engine is in operation, in order to change the air-fuel ratio of the exhaust gas from the engine independently of the engine operating air-fuel ratio.

In this embodiment, as the amount of $NO_X$ absorbed by the $NO_X$ occluding and reducing catalyst 7 increases during the operation at a lean air-fuel ratio, the ineffective fuel that does not burn in the cylinder is supplied to the engine so that the exhaust gas from the engine becomes a rich air-fuel ratio, thereby to release $NO_X$ from the $NO_X$ occluding and reducing catalyst and to purify the $NO_X$ by reduction (to regenerate the $NO_X$ occluding and reducing catalyst).

In this embodiment, the ECU 30 increases or decreases the value of an $NO_X$ counter in order to estimate the amount of $NO_X$ absorbed and held by the $NO_X$ occluding and reducing catalyst 7. The amount of $NO_X$ absorbed by the $NO_X$ occluding and reducing catalyst 7 per a unit time varies in proportion to the amount of $NO_X$ in the exhaust gas flowing into the $NO_X$ occluding and reducing catalyst per a unit time, i.e., varies in proportion to the amount of $NO_X$ generated by the engine 1 per a unit time. On the other hand, the amount of $NO_X$ generated by the engine per a unit time is determined by the amount of fuel fed to the engine, air-fuel ratio, flow rate of the exhaust gas, etc. When the operation conditions of the engine are determined, therefore, it is possible to know the amount of $NO_X$ absorbed by the $NO_X$ occluding and reducing catalyst. According to this embodiment, the engine operating conditions (degree of accelerator opening, engine rotational speed, amount of the air taken in, intake air pressure, air-fuel ratio, amount of feeding fuel, etc.) are changed to measure the amount of $NO_X$ generated by the engine per a unit time, and the amount of $NO_X$ absorbed by the $NO_X$ occluding and reducing catalyst 7 per a unit time is stored in the ROM of ECU 30 in the form of a numerical value table using, for example, load on the engine (amount of fuel injection) and the engine rotational speed as parameters. The ECU 30 calculates the amount of $NO_X$ absorbed by the $NO_X$ occluding and reducing catalyst per a unit time after every predetermined period of time (after every unit time) by using the load on the engine (amount of fuel injection) and the engine rotational speed, and increases the value of the $NO_X$ counter by the amount of $NO_X$ absorbed. Therefore, the value of the $NO_X$ counter always indicates the amount of $NO_X$ absorbed by the $NO_X$ occluding and reducing catalyst 7. When the value of the $NO_X$ counter exceeds a predetermined value while the engine is in operation at a lean air-fuel ratio, the ECU 30 supplies to the engine the fuel that does not burn in the combustion chamber to change the air-fuel ratio of the exhaust gas of the engine over to a rich air-fuel ratio. Therefore, the exhaust gas having a rich air-fuel ratio flows into the $NO_X$ occluding and reducing catalyst irrespective of the engine operating air-fuel ratio. Therefore, the absorbed $NO_X$ is released from the $NO_X$ occluding and reducing catalyst and is purified by reduction. The time for maintaining the exhaust gas air-fuel ratio rich by supplying the ineffective fuel is experimentally determined based upon the kind and volume of the $NO_X$ occluding and reducing catalyst. The value of the $NO_X$ counter is reset to 0 after the $NO_X$ is released from the $NO_X$ occluding and reducing catalyst and is purified by reduction upon supplying the ineffective fuel. Upon supplying the ineffective fuel based on the amount of $NO_X$ absorbed by the $NO_X$ occluding and reducing catalyst 7 as described above, the $NO_X$ occluding and reducing catalyst 7 is properly regenerated and is not saturated with the absorbed $NO_X$.

As described above, the ineffective fuel is supplied by the two methods, i.e., a method which injects the secondary fuel from the direct cylinder fuel injection valve into the cylinder in the expansion stroke or the exhaust stroke of the cylinder, and a method which injects the fuel into the exhaust port. In this embodiment having the direct cylinder fuel injection valves 111 to 114, the ineffective fuel is supplied to the engine by the secondary fuel injection. The present invention, however, can be similarly applied even to the engine equipped with exhaust port fuel injection valves and in which the ineffective fuel is supplied by the exhaust port fuel injection.

When the ineffective fuel is supplied to the engine by the secondary fuel injection (or exhaust port fuel injection) as described above, the exhaust gas of the engine contains relatively large amounts of unburned fuel supplied as the ineffective fuel. When the ineffective fuel is supplied while the EGR is being executed, therefore, the exhaust gas containing relatively large amounts of unburned fuel is recirculated into the intake passage 10 through the EGR passage 43, and the unburned fuel is supplied into the combustion chamber in the cylinder and is burned in the combustion chamber. As described above, however, the amount of fuel injection into the engine (hereinafter referred to as the amount of main fuel injection to make a distinction over the ineffective fuel) is controlled to an optimum value by the ECU 30 based on the engine operating conditions. When the unburned fuel supplied into the combustion chamber together with the recirculated exhaust gas burns, therefore, the amount of fuel supplied into the engine becomes excessive, and the air-fuel ratio becomes too rich causing the combustion to become unstable, or the rich combustion air-fuel ratio causes the engine to produce an increased output, resulting in a change in the engine output torque.

When the secondary fuel is injected according to this embodiment, therefore, the EGR is limited to solve the above-mentioned problem. That is, the EGR is limited (e.g., interrupted), whereby no exhaust gas containing the unburned fuel recirculates into the combustion chamber of the engine. Therefore, the combustion air-fuel ratio in the combustion chamber varies in proportion to the amount of main fuel injection, and the air-fuel ratio is prevented from becoming more rich than an optimum value.

Figure 10:
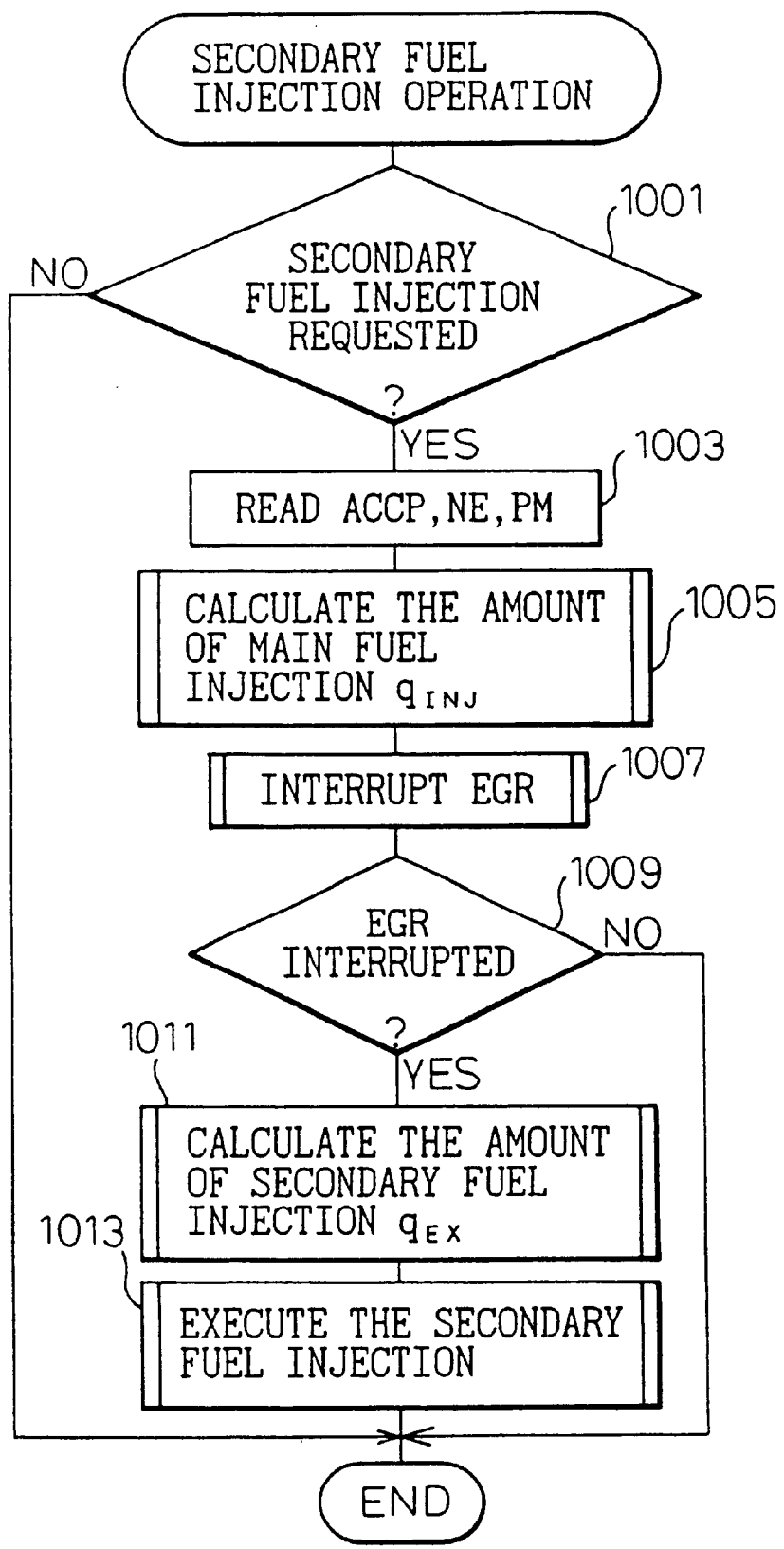
FIG. 10 is a flow chart illustrating the secondary fuel injection operation according to a fourth embodiment of the present invention.

FIG. 10 is a flow chart illustrating the operation of the secondary fuel injection according to the embodiment. This operation is conducted by a routine executed by the ECU 30 at every predetermined interval (e.g., at every predetermined crankshaft rotation angle).

When the operation starts in FIG. 10, it is judged at a step 1001 whether the secondary fuel injection is now requested. In this embodiment, the ECU requests the secondary fuel injection for a predetermined period of time only when the value of the $NO_X$ counter CNOX of the $NO_X$ occluding and reducing catalyst 7 becomes larger than a predetermined value.

When the secondary fuel injection is requested at the step 1001, the degree of accelerator opening ACCP, the engine rotational speed NE and the engine intake air pressure PM are read at a step 1003 and where the present operation mode (① to ⑤) is judged from ACCP and NE. Further, the present main fuel injection amount qINJ of the engine is calculated from the numerical value table prepared for each of the operation modes based on ACCP and NE (modes ① to ③) or based on PM and NE (modes ④ and ⑤).

At a step 1007, the EGR is interrupted. In this embodiment, the EGR is interrupted by fully closing the EGR valve 41. At a step 1009, it is judged whether the EGR is interrupted by the above operation (i.e., whether the EGR valve 41 is fully closed). Steps 1011 and 1013 are not executed until the EGR is interrupted.

When the EGR is interrupted at the step 1009, the secondary fuel injection amount $q_{EX}$ is calculated at the step 1011. The secondary fuel injection amount $q_{EX}$ is calculated based on the main fuel injection amount $q_{INJ}$ and the engine operating air-fuel ratio so that the air-fuel ratio of the exhaust gas flowing into the $NO_X$ occluding and reducing catalyst 7 becomes a predetermined rich air-fuel ratio. At the step 1013, the secondary fuel is injected into all cylinders in the expansion stroke or in the exhaust stroke. When the secondary fuel injection is not requested at the step 1001, the operation immediately terminates without injecting the secondary fuel. In this case, the EGR that is being effected is allowed to continue.

In this embodiment, the EGR is interrupted when the secondary fuel is injected, to prevent the unburned fuel from recirculating into the engine combustion chamber and to prevent the combustion from losing stability and the output torque from changing. In this embodiment, the EGR is completely interrupted when the secondary fuel is injected. In the actual operation, however, problems do not occur even if the unburned fuel is recirculated into the combustion chamber to some extent unless the combustion becomes unstable and the output torque changes. Therefore, a maximum EGR amount may be found in advance through experiment that does not cause problem even if the EGR is executed with the secondary fuel being injected, and the EGR amount may be decreased to a value not larger than the above maximum value when the secondary fuel is injected.

(5) Fifth Embodiment

The fourth embodiment has dealt with the case of the external EGR system. However, the same control operation can be applied to the case of the internal EGR system, too.

Figure 11:
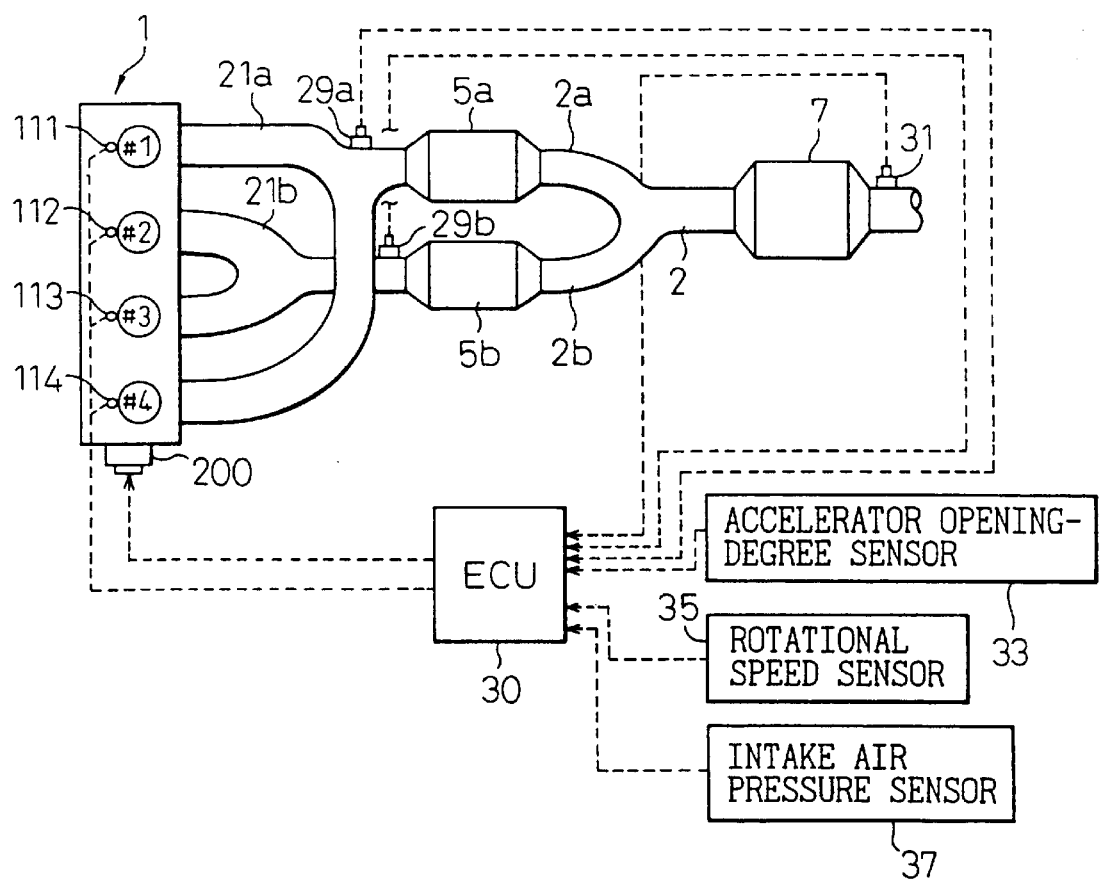
FIG. 11 is a diagram schematically illustrating the general construction of an embodiment when the present invention is applied to an internal combustion engine that executes the internal EGR for automobiles.

FIG. 11 is a diagram schematically illustrating the constitution of a fifth embodiment of the present invention using the internal EGR system. In FIG. 11, reference numerals the same as those of FIGS. 1 and 9 denote elements similar to those of FIGS. 1 and 9.

The embodiment of FIG. 11 is provided with neither the EGR passage 43 nor the EGR valve 41 of FIG. 9. Instead, the internal EGR is controlled by using a variable valve timing device 200 for varying the valve timings of the engine 1. In this embodiment, any known variable valve timing device 200 can be used provided it is capable of varying the valve timings of the engine 1 based on control signals from the ECU 30. For example, there can be used any one for varying the open-close timings of the intake valves and/or the exhaust valves, or for varying the open-close timings as well as the valve lift. The valve timings may be varied either continuously or stepwisely.

Figure 12:
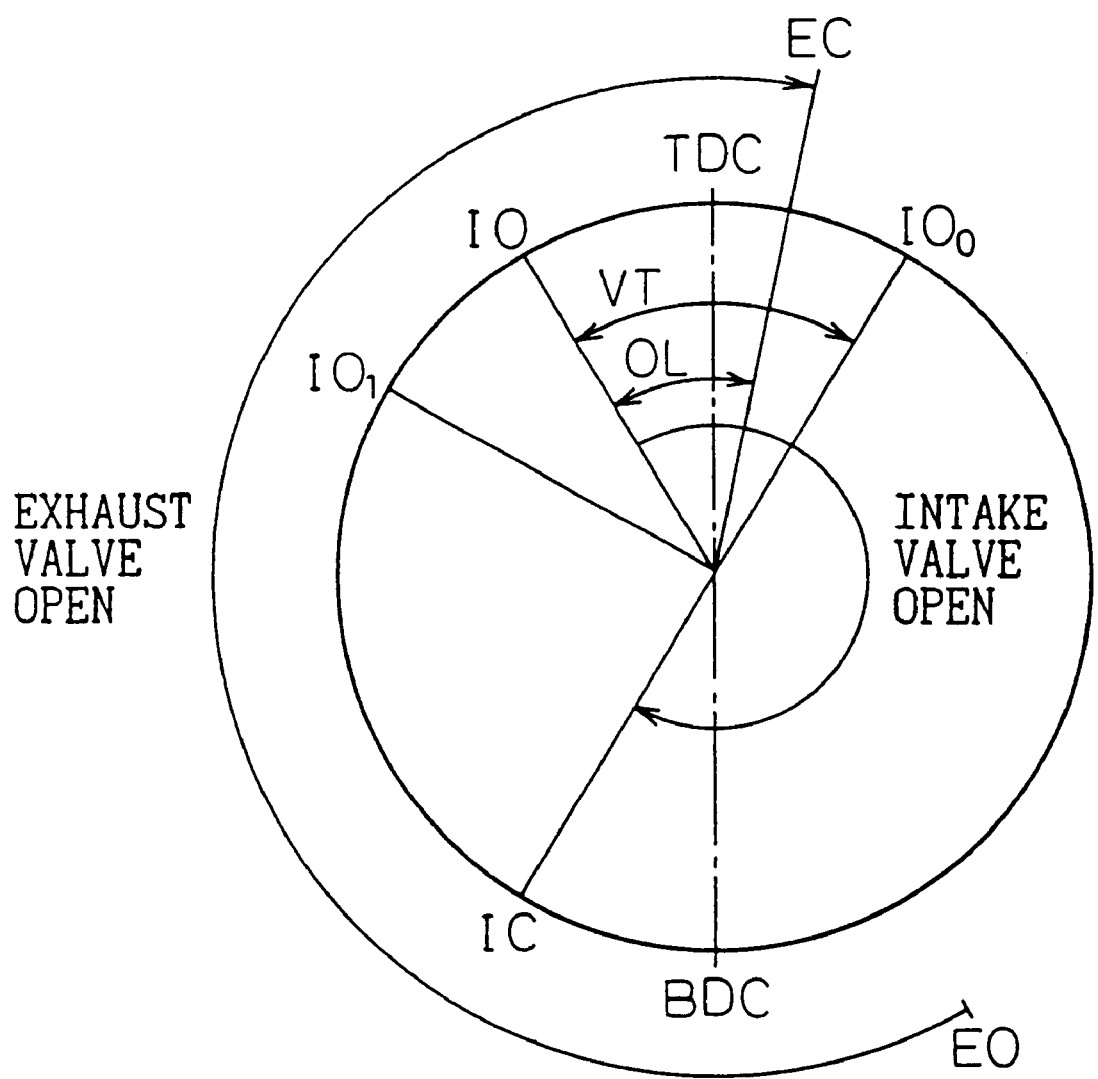
FIG. 12 is a diagram illustrating valve timings of the engine of FIG. 11.

FIG. 12 is a diagram illustrating the valve timings of the engine 1. FIG. 12 schematically illustrates general open-close timings of an intake valve and an exhaust valve, and where the open-close timings of the intake valve are changed by an equal amount. In FIG. 12, TDC is the top dead center of the piston, BDC is the bottom dead center, IO and IC are the valve-opening timing and the valve-closing timing of the intake valve, and EO and EC are the valve-opening timing and the valve-closing timing of the exhaust valve. As shown in FIG. 12, the intake valve is opened before the top dead center (TDC) in the exhaust stroke and is closed after the bottom dead center (BDC) in the suction stroke. The exhaust valve is opened before the bottom dead center (BDC) in the explosion stroke and is closed after the top dead center (TDC) in the exhaust stroke. In the exhaust stroke as shown in FIG. 12, the valve timing has been so set that the intake valve is opened (IO) before the exhaust valve is closed (EC) and, hence, there exists a period in which both the intake valve and the exhaust valve are opened (OL in FIG. 12). In this embodiment, the length (angle) of the period OL is called valve overlapping amount. In this embodiment, as will be described later, the intake valve timing (valve-opening timing) can be adjusted from a timing represented by $IO_0$ (most delayed timing) to a timing represented by $IO_1$ (most advanced timing) shown in FIG. 12. In this embodiment, further, the crankshaft rotation angle from the most delayed valve timing position ($IO_0$) to the present position (IO) is defined to be a valve timing value VT. In this embodiment as will be understood from FIG. 12, the timing for closing the exhaust valve is fixed and, hence, the valve timing value VT and the valve overlapping amount OL correspond to each other in a 1:1 manner.

In general, the time in which the intake valve remains opened during the exhaust stroke increases with an increase in the valve overlapping amount OL of the intake and exhaust valves (with an increase in the intake valve timing VT). Therefore, the burned gas (exhaust gas) after the combustion in the cylinder flows reversely into the intake port through the intake valve that is opened, and is recirculated again into the cylinder during the suction stroke. Therefore, the amount of exhaust gas (amount of EGR gas) recirculated into the engine combustion chamber increases with an increase in the valve overlapping amount OL. According to this embodiment, therefore, the ECU 30 adjusts the amount of the exhaust gas recirculating into the engine combustion chamber by controlling the intake valve timing VT (i.e., valve overlapping amount OL) instead of controlling the opening degree of the EGR valve 41 of FIG. 9.

When the secondary fuel is injected into the cylinders during the expansion stroke or the exhaust stroke, the ineffective fuel that is injected partly flows reversely into the intake port together with the burned gas during the overlapping period and recirculates into the combustion chamber during the suction stroke, causing the same problem as that of the external EGR. In this case, therefore, the ECU 30 interrupts the EGR (sets the overlapping amount OL to 0) when the secondary fuel is being injected, so that the combustion will not lose stability and the output torque will not be changed by the recirculation of the unburned fuel.

The operation in this case is the same as that of the flow chart of FIG. 10. However, the operation for interrupting the EGR at the step 1007 is executed by delaying the intake valve timing VT and by setting the valve overlapping amount to be 0.

In this case, too, the EGR amount may be decreased to such a degree that no problem occurs in practice when the secondary fuel is injected, instead of interrupting the EGR.

(6) Sixth Embodiment

Described below is a sixth embodiment of the present invention.

In the fourth and fifth embodiments, the EGR is interrupted when the secondary fuel is injected. In the embodiment described below, however, the injection of secondary fuel is inhibited when the EGR is executed. Since no secondary fuel is injected when the EGR is executed, no unburned fuel is contained in the exhaust gas recirculated into the engine combustion chamber. Similar to the above-mentioned embodiments, therefore, a problem caused by the recirculation of the unburned fuel into the combustion chamber does not occur.

Figure 13:
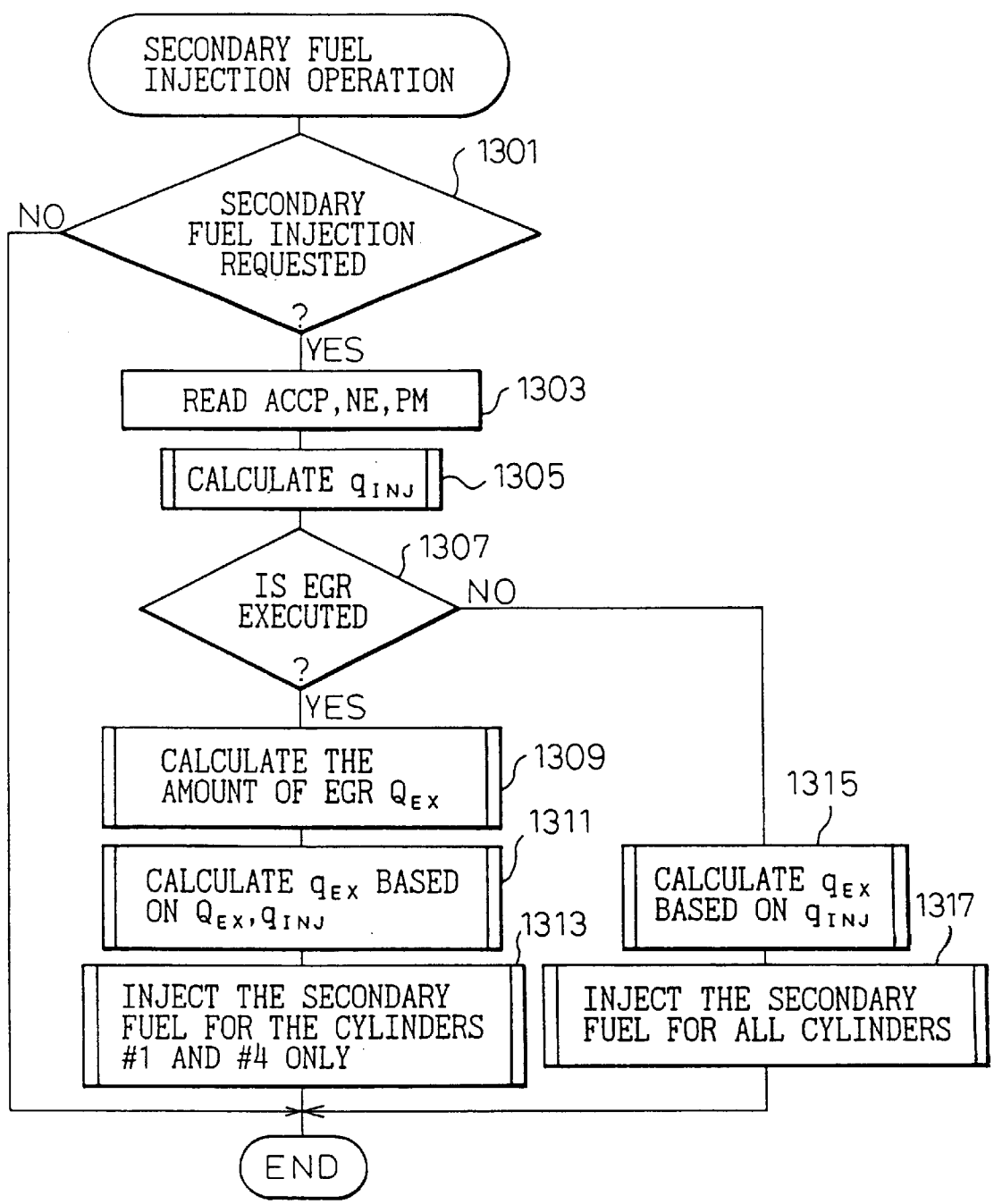
FIG. 13 is a flow chart illustrating the secondary fuel injection operation according to a sixth embodiment of the present invention.

FIG. 13 is a flow chart illustrating the operation of the secondary fuel injection when the secondary fuel injection is inhibited at the time of executing the EGR in the engine of the external EGR system of FIG. 9. This operation is conducted by a routine executed by the ECU 30 at predetermined interval (e.g., at predetermined crankshaft rotation angle).

In the engine 1 of FIG. 9, the EGR passage 43 is connected to the exhaust passage 2b of the cylinders #2 and #3 of the engine. When the EGR is executed, therefore, the secondary fuel injection may be inhibited for the cylinders #2 and #3 to prevent the unburned fuel from being mixed into the recirculating exhaust gas. In this operation, therefore, the secondary fuel is not injected into the cylinders #2 and #3 when the EGR is executed, and the secondary fuel is injected into the cylinders #1 and #4 only.

When the operation starts in FIG. 13, it is judged at a step 1301 whether the secondary fuel injection is now requested. When the secondary fuel injection is requested, the degree of accelerator opening ACCP, the engine rotational speed NE and the engine intake air pressure PM are read at a next step 1303 the present main fuel injection amount $q_{INJ}$, is calculated. Operations at steps 1301 to 1305 are the same as operations of the steps 1001 to 1005 of FIG. 10.

Next, it is judged at a step 1307 whether the EGR is now being effected. When the EGR is effected, the amount $Q_{EX}$ of recirculating exhaust gas is calculated at a step 1309 based on the main fuel injection amount $q_{INJ}$ and the rotational speed NE. Then, at a step 1311, the secondary fuel injection amount $q_{EX}$ is calculated based on the EGR amount $Q_{EX}$ and the main fuel injection amount $q_{INJ}$. In this embodiment, the secondary fuel injection amount $q_{EX}$ is set in advance based on the main fuel injection amount $q_{INJ}$ and the amount $Q_{EX}$ of recirculating exhaust gas, so that the air-fuel ratio of the exhaust gas flowing into the $NO_X$ occluding and reducing catalyst 7 becomes a predetermined rich air-fuel ratio. When the EGR is effected, however, no secondary fuel is injected to the cylinders #2 and #3. Therefore, the air-fuel ratio of the exhaust gas flowing into the $NO_X$ occluding and reducing catalyst 7 must be maintained at a predetermined rich air-fuel ratio by injecting the secondary fuel into the cylinders #1 and #4 only. In this embodiment, the secondary fuel injection amount $q_{EX}$ is set previously based on the main fuel injection amount $q_{INJ}$ and the amount $Q_{EX}$ of circulating exhaust gas (based on combustion air-fuel ratio in the cylinder determined by $q_{EX}$ and $Q_{EX}$) for the case where the secondary fuel is injected into the cylinders #1 and #4 only, and is stored as a numerical value table using $q_{INJ}$ and $Q_{EX}$ as parameters in the ROM of the ECU 30. At a step 1311, therefore, the secondary fuel injection amount $q_{EX}$ is calculated from $q_{INJ}$ and $Q_{EX}$ based on the numerical value table. At a step 1313, the secondary fuel is injected in the expansion stroke or in the exhaust stroke of the cylinders #1 and #4.

When the EGR is not being effected at the step 1307, the operation proceeds to a step 1315 where the secondary fuel injection amount qua is calculated. Here, since the EGR is not being effected, the secondary fuel is injected into all cylinders, and the secondary fuel injection amount $q_{EX}$ is calculated based on the main fuel injection amount $q_{INJ}$ and the engine operating air-fuel ratio like at the step 1011 in FIG. 10. At a step 1317, the secondary fuel is injected into all cylinders inclusive of the cylinders #2 and #3 in the expansion stroke or in the exhaust stroke. When the secondary fuel injection is not requested at the step 1301, the secondary fuel is not injected, and the operation is immediately terminated.

Figure 14:
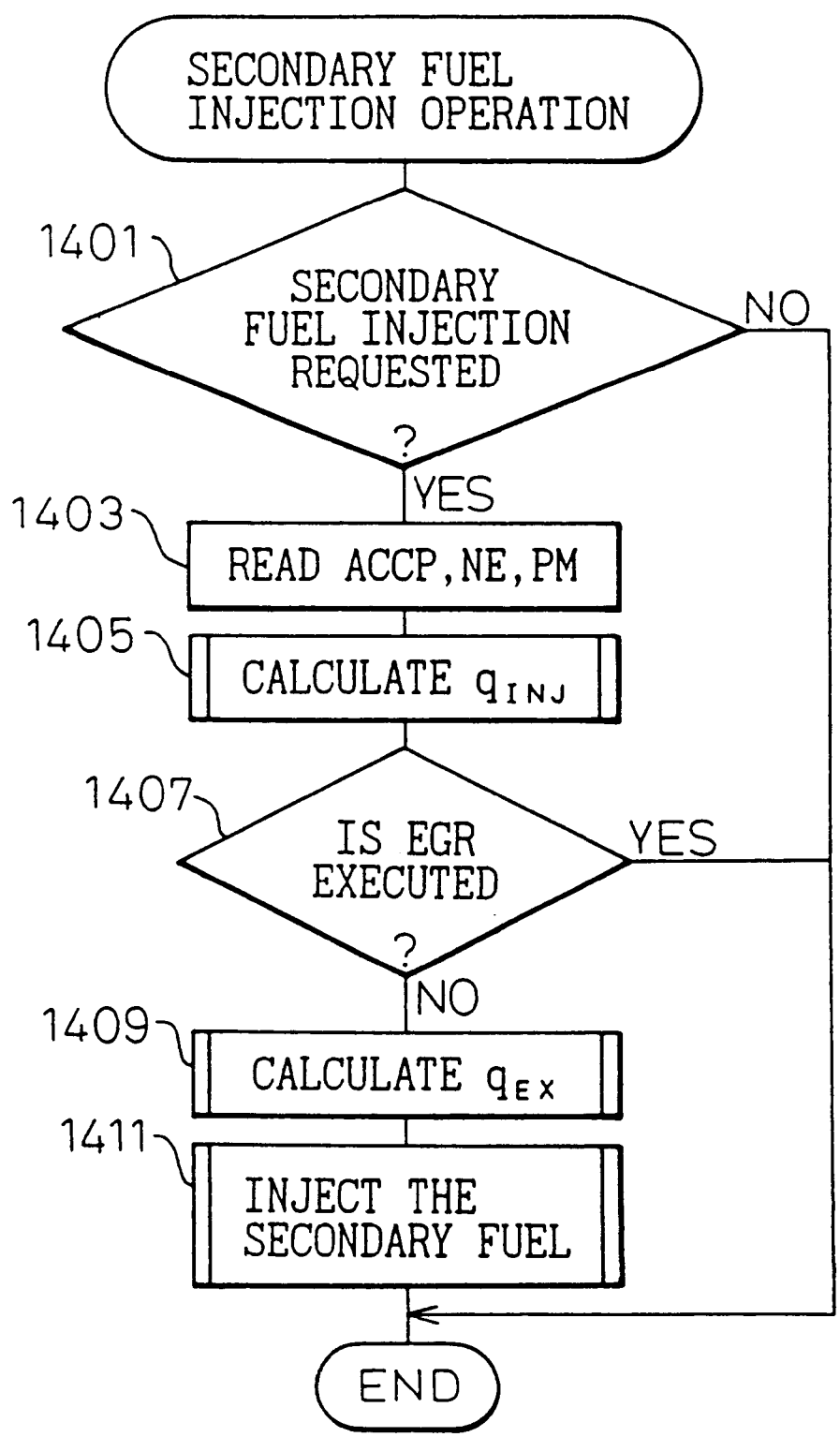
FIG. 14 is a flow chart illustrating the secondary fuel injection operation according to the sixth embodiment of the present invention but is different from that of FIG. 13.

When the EGR is being executed as described above, the secondary fuel injection is inhibited to completely prevent the unburned fuel from being mixed into the engine combustion chamber. In this embodiment, the secondary fuel injection is completely inhibited when the EGR is being effected. However, in the actual operation, problems do not occur even if the unburned fuel enters into the combustion chambers provided the amount of the unburned fuel is small enough so that it does not cause the combustion to lose stability or does not cause a change in the torque. Therefore, a maximum secondary fuel injection amount may be set in advance through experiment in such a manner that it does not cause the combustion to lose stability or does not cause a change in the torque when the EGR is being effected, and the secondary fuel injection amount for the cylinders #2 and #3 may be decreased to a value smaller than the maximum amount when the EGR is effected;

FIG. 14 is a flow chart for explaining the operation of the secondary fuel injection when the secondary fuel injection is inhibited in the engine of the internal EGR system of FIG. 11 while the EGR is being effected. This operation is conducted by a routine executed by the ECU 30 at every predetermined interval (e.g., at every predetermined crankshaft rotation angle).

When the operation starts in FIG. 14, it is judged at steps 1401 to 1405 whether the secondary fuel injection is requested (step 1401), and ACCP, NE and PM are read (1403), and the main fuel injection amount $q_{INJ}$ is calculated (step 1405). Operations of the steps 1401 to 1405 are the same as those of the steps 1301 to 1305 in FIG. 13. At a step 1407, it is judged whether the EGR is now being effected based on the engine valve overlapping amount OL. When OL=0 (no overlapping), the internal EGR is not now being effected, and the operation proceeds to a step 1409 where the secondary fuel injection amount $q_{EX}$ is calculated. At a step 1411, the secondary fuel is injected into all cylinders in the expansion stroke or in the exhaust stroke. Operations at the steps 1409 and 1411 are the same as those of the steps 1315 and 1317 of FIG. 13. In this embodiment, on the other hand, when the EGR is being effected at the step 1407, the secondary fuel is injected into none of the cylinders. That is, the secondary fuel injection is inhibited for all cylinders, and the unburned fuel is prevented from recirculating into the combustion chambers.

In this embodiment, too, the secondary fuel may be injected but in such a small amount that does not cause any problem instead of inhibiting the secondary fuel from being injected into the cylinders while the EGR is being effected.

(7) Seventh Embodiment

Next, described below is a further embodiment of the present invention. In the embodiments of FIGS. 13 and 14, the secondary fuel injection is limited while the EGR is being effected to prevent the unburned fuel from being recirculated into the combustion chambers. However, in the internal EGR system of FIG. 11, in particular, limitation of the secondary fuel injection makes it quite difficult to release $NO_X$ from the $NO_X$ occluding and reducing catalyst 7. When the secondary fuel injection is limited whenever the EGR is effected, therefore, the frequency of the operation for releasing $NO_X$ from the $NO_X$ occluding and reducing catalyst decreases, and the $NO_X$ occluding and reducing catalyst tends to be saturated with the $NO_X$ which it has absorbed. In an embodiment that will be described below, therefore, when the amount of recirculating exhaust gas while the EGR is being effected is larger than a predetermined value, the secondary fuel injection is inhibited even when the secondary fuel injection is requested like in the embodiment of FIG. 14. When the amount of recirculating exhaust gas is smaller than the predetermined value, however, contrary to the above-mentioned operation, the secondary fuel is injected while interrupting the EGR. When the EGR is interrupted, the amount of $NO_X$ emitted from the engine increases. However, the amount of $NO_X$ emission does not greatly increase even when the EGR is interrupted when the amount of recirculating exhaust gas before the EGR is interrupted is relatively small. When the amount of recirculating exhaust gas is relatively small, therefore, it becomes advantageous, as a whole, to increase the frequency for releasing $NO_X$ by injecting the secondary fuel while interrupting the EGR. In this embodiment, since the engine equipped with the internal EGR system is used as shown in FIG. 11, the secondary fuel injection is inhibited when the amount of recirculating exhaust gas by the EGR is larger than a predetermined value but, conversely, the secondary fuel is injected while interrupting the EGR when the amount of recirculating exhaust gas is smaller than the predetermined value. This makes it possible to prevent the combustion from losing stability and the engine output torque from changing, due to by the recirculation of the unburned fuel into the combustion chambers, while maintaining a high frequency for executing the operation for releasing $NO_X$ from the $NO_X$ occluding and reducing catalyst.

Figure 15:
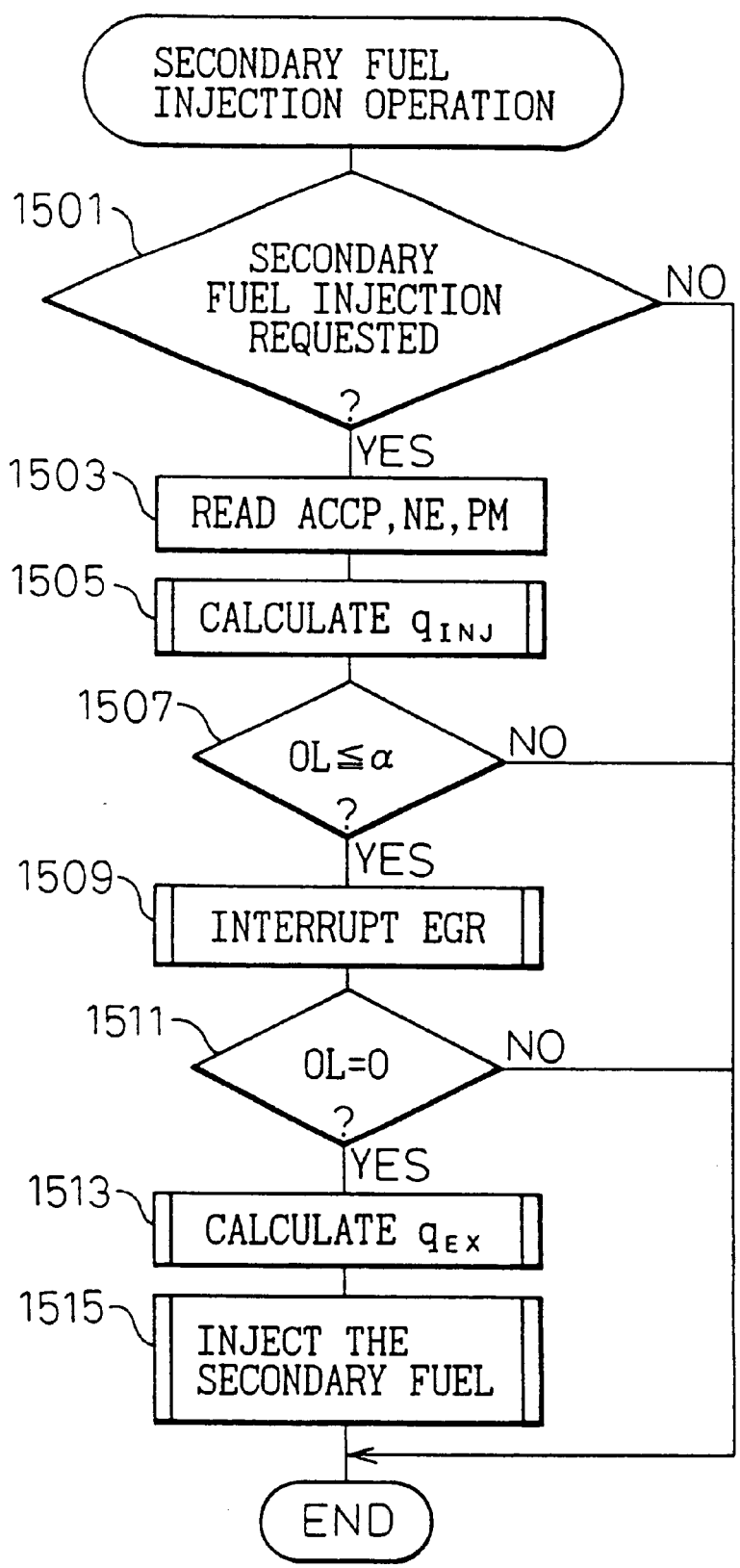
FIG. 15 is a flow chart illustrating the secondary fuel injection operation according to a seventh embodiment of the present invention.

FIG. 15 is a flow chart illustrating the operation of the secondary fuel injection according to the embodiment. This operation is conducted by a routine executed by the ECU 30 at every predetermined interval (e.g., at every predetermined crankshaft rotation angle).

In the operation of FIG. 15, it is judged at a step 1501 whether the secondary fuel injection is now being requested. At steps 1503 and 1505, the main fuel injection amount $q_{INJ}$, is calculated based on ACCP, NE and PM. The operations at the steps 1501 to 1505 are the same as those of the steps 1001 to 1005 of FIG. 10.

After the main fuel injection amount $q_{INJ}$ is calculated at the step 1505, it is judged at a step 1507, based on the valve overlapping amount OL, whether the amount of recirculating exhaust gas due to EGR is now larger than the predetermined amount. As described earlier, the amount of exhaust gas recirculating into the combustion chamber due to EGR increases with an increase in the valve overlapping amount OL. In this embodiment, therefore, when the valve overlapping amount OL is larger than a predetermined value α, it is so judged that the amount of the recirculating exhaust gas due to EGR is now larger than the predetermined value.

When the secondary fuel injection is not requested at the step 1501 and when the valve overlapping amount OL is larger than the predetermined value α at the step 1507, the operation readily ends without executing the operations of a step 1509 and of subsequent steps. That is, when the exhaust gas is recirculated in large amounts into the combustion chamber, the secondary fuel is not injected even when the secondary fuel injection is requested.

On the other hand, when the valve overlapping amount OL is smaller than a at the step 1505, i.e., when the exhaust gas is recirculated in small amounts by the EGR, the operation proceeds to the step 1509 to execute the interruption operation (i.e., to accomplish OL=0 by delaying the intake valve timing VT). After the interruption of EGR is confirmed at a step 1511, i.e., when OL=0 is established, the secondary fuel injection amount $q_{EX}$ is calculated at a step 1513, and, at a step 1515, the secondary fuel is injected into all cylinders in the expansion stroke or in the exhaust stroke. Operations of the steps 1513 and 1515 are the same as those of the steps 1011 and 1013 of FIG. 10.

When the valve overlapping amount OL is larger than the predetermined value a, therefore, the secondary fuel injection is inhibited and the EGR continues. When the valve overlapping amount OL is smaller than the predetermined value a, the EGR is interrupted and the secondary fuel is injected. Therefore, the frequency for injecting the secondary fuel increases (frequency for releasing $NO_X$ from the $NO_X$ occluding and reducing catalyst increases), and the $NO_X$ occluding and reducing catalyst is prevented from being saturated.

(8) Eighth Embodiment

Described below is a still further embodiment of the present invention.

In the above-mentioned fourth to seventh embodiments, the secondary fuel injection is limited when the EGR is being effected, or the EGR is limited when the secondary fuel is being injected. When the secondary fuel injection is limited, however, the frequency for executing the operation for releasing $NO_X$ from the $NO_X$ occluding and reducing catalyst may decrease, and the efficiency for purifying the exhaust gas may drop due to the saturation of the $NO_X$ occluding and reducing catalyst. When the EGR is limited, further, the amount of $NO_X$ emitted from the engine increases. It is therefore desired to effect both the EGR and the secondary fuel injection simultaneously without limitation, if it is possible.

When the ineffective fuel is supplied while the EGR is being effected, a problem occurs, since the unburned fuel is recirculated into the combustion chamber together with the recirculating exhaust gas, in that excess fuel is supplied to the combustion chamber. Therefore, if the fuel is not supplied in excess amounts into the combustion chamber, the problem does not occur even if the ineffective fuel is supplied while the EGR is being effected. In the embodiment described below, therefore, the amount of unburned fuel recirculated into the combustion chamber is estimated when the ineffective fuel is supplied while the EGR is being effected, and the amount of the main fuel injection is decreased relative to the target value by the amount of the unburned fuel. Even when the unburned fuel recirculates, therefore, the sum of the amount of fuel supplied to the engine combustion chamber is maintained to be the same as the target value of the main fuel injection amount, and the fuel is not supplied in excess amounts. When the EGR is being effected, therefore, the secondary fuel is injected without being limited, preventing the combustion from losing stability and preventing a change in the output torque.

Prior to describing the operation for correcting the main fuel injection amount according to this embodiment, mentioned below first is a method of calculating the amount of unburned fuel recirculating into the combustion chamber due to the supply of ineffective fuel at the time when the EGR is being effected in the embodiment. In this embodiment, the amount of recirculating of the unburned fuel by the supply of ineffective fuel at the time of effecting the EGR is calculated based on the method which is nearly the same as the one described with reference to FIG. 7.

Figure 16:
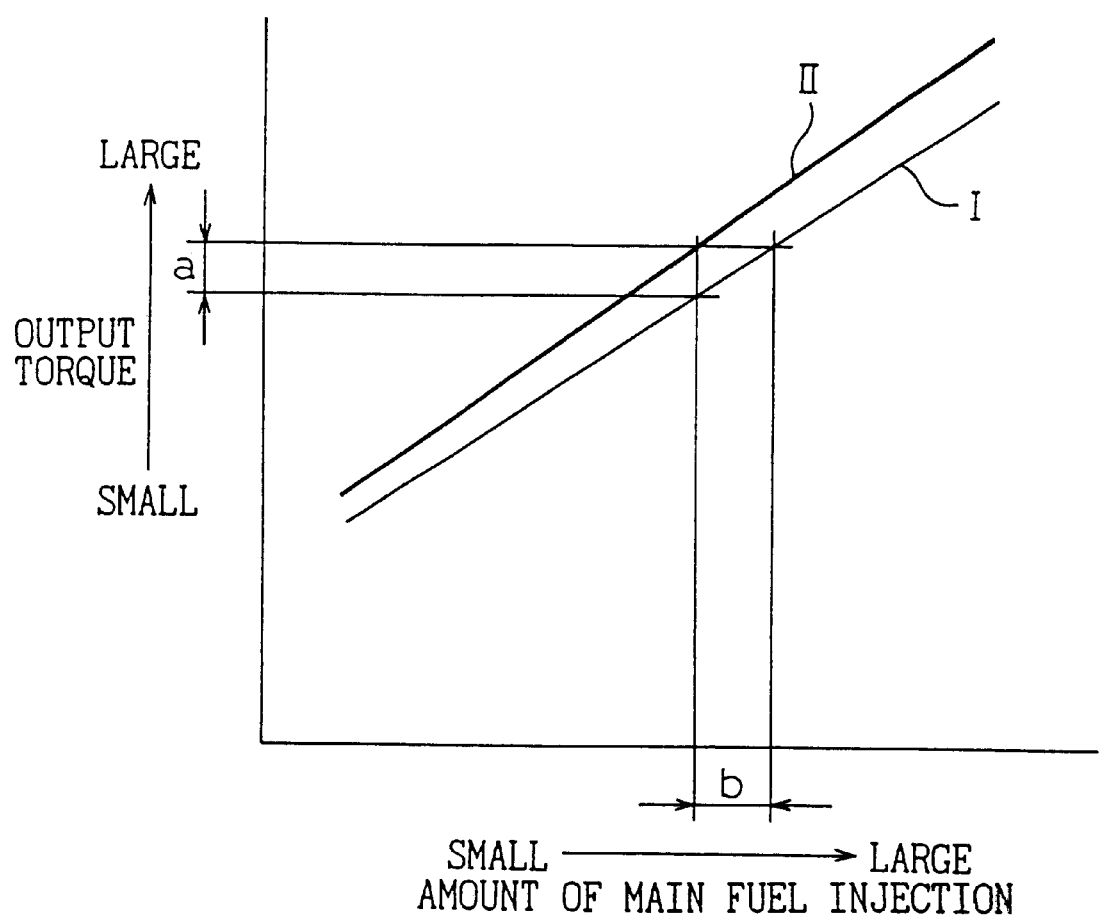
FIG. 16 is a diagram illustrating a method of calculating the amount of unburned fuel recirculated into the combustion chamber.

FIG. 16 is a graph showing a relationship between the cylinder output torque (ordinate) of when the engine is operated at a predetermined rotational speed and the amount of the main fuel injection (abscissa). In FIG. 16, a curve I represents a relationship between the output torque and the amount of main fuel injection of when the EGR is being effected, and a curve II represents a relationship between the output torque and the amount of main fuel injection of when the ineffective fuel is supplied (secondary fuel in this case) while the EGR is being effected. As described earlier, the amount of the secondary fuel has been set to be the one required for bringing the air-fuel ratio of the exhaust gas to the target air-fuel ratio for each of the cases, and is determined from the engine load (main fuel injection) and the rotational speed. Similarly, the amount of recirculating the exhaust gas by the EGR is determined from the engine load and the rotational speed.

If the unburned fuel does not recirculate by the secondary fuel injection into the combustion chamber, the cylinder output torque remains the same irrespective of the secondary fuel injection. However, when the unburned fuel recirculates due to the secondary fuel injection, the cylinder output torque increases at the time when the secondary fuel is injected by an amount corresponding to the amount of the unburned fuel that is recirculated (curve II in FIG. 16).

In this embodiment, when the output torque is increased by the amount a shown in FIG. 16 with a given main fuel injection amount due to the secondary fuel injection while the EGR is being executed, the recirculating amount of the unburned fuel is estimated by presuming that an increase in the amount of the main fuel injection (amount b in FIG. 16) necessary for increasing the output torque by the amount a when the EGR is being effected without the secondary fuel injection, is equal to the amount of the unburned fuel recirculating into the combustion chamber due to the secondary fuel injection.

That is, in this embodiment, curves corresponding to FIG. 16 are prepared, in advance, through experiment for every combination of the engine rotational speeds and the above-mentioned engine operating modes ① to ⑤, in order to calculate the recirculating amount of the unburned fuel (b in FIG. 16) in their respective main fuel injection amounts when the EGR is being effected. The values of unburned fuel amounts b are prepared as a numerical value table using the engine rotational speed NE and the main fuel injection amount $q_{INJ}$ as parameters for each of the operating modes, and are stored in the ROM of the ECU 30. When the engine is in operation, the ECU calculates the amount b of the unburned fuel recirculating into the combustion chamber when the EGR is being effected based on the engine rotational speed NE and the main fuel injection amount $q_{INJ}$.

Figure 17:
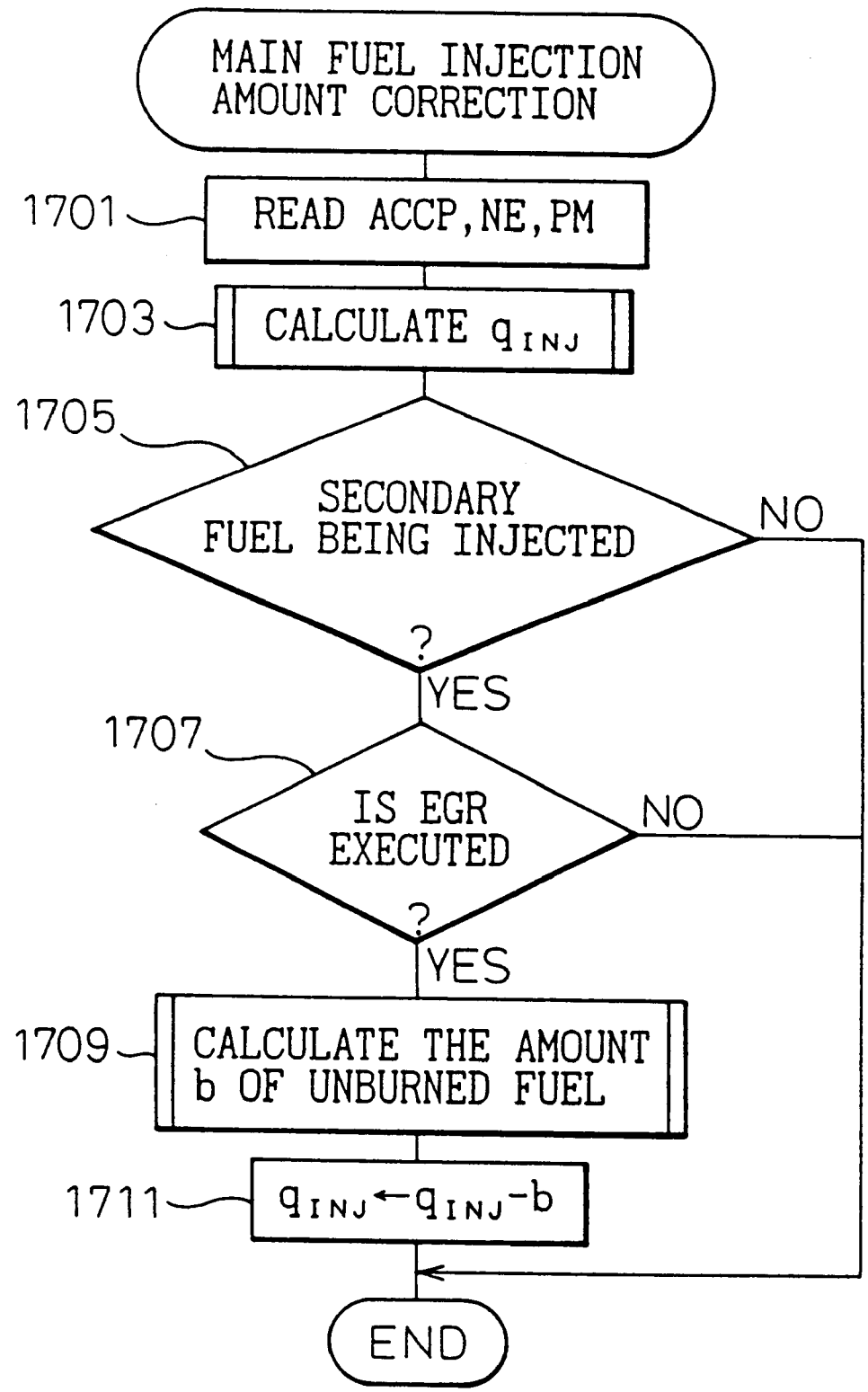
FIG. 17 is a flow chart illustrating the operation for correcting the amount of main fuel injection according to an eighth embodiment of the present invention using the method of FIG. 16.

FIG. 17 is a flow chart illustrating the operation for correcting the amount of main fuel injection according to the embodiment. This operation is executed at every predetermined crank rotation angle of the engine.

When the operation starts in FIG. 17, the engine load (degree of accelerator opening) ACCP and the rotational speed NE are read at a step 1701, and the main fuel injection amount $q_{INJ}$ is calculated at a step 1703. Operations of the steps 1701 and 1703 are the same as those of the steps 1003 and 1005 of FIG. 10.

Next, it is judged at a step 1705 whether the secondary fuel is now being injected and at a step 1707, it is judged whether the EGR is being effected. When both the secondary fuel injection and the EGR are now being effected, the unburned fuel recirculates into the combustion chamber due to the secondary fuel injection. At a step 1709, therefore, the amount b of unburned fuel that recirculates into the combustion chamber when the secondary fuel is injected is calculated from the above-mentioned numerical value table prepared for each of the operating modes based on the relationship of FIG. 16, by using the main fuel injection amount $q_{INJ}$ calculated at the step 1703. Then, at a step 1711, the main fuel injection amount $q_{INJ}$ calculated at the step 1703 is decreased by the recirculating amount b of the unburned fuel.

When either the secondary fuel injection or the EGR has not been effected at the steps 1705 and 1707, it is not probable that the unburned fuel recirculates into the combustion chamber. Therefore, the corrections are not effected at the steps 1709 and 1711, and the operation ends.

According to this embodiment, since the secondary fuel is injected without being limited even when the EGR is being effected, both an increase in the amount of $NO_X$ emitted by the engine and a decrease in the frequency for executing the operation for releasing $NO_X$ from the $NO_X$ occluding and reducing catalyst can be prevented.

According to the present invention as described above, the combustion in the engine does not lose stability and the output torque does not change even when the ineffective fuel, which does not burn in the combustion chamber but is discharged together with the exhaust gas, is supplied to the engine.

What is claimed is:

1. A control system for an internal combustion engine comprising:
    a direct cylinder fuel injection valve for directly injecting the fuel into a cylinder of an internal combustion engine; and
    a fuel injection control means which executes a main fuel injection to inject the fuel that burns in the cylinder by controlling said direct cylinder fuel injection valve, and further executes, as required, a secondary fuel injection to inject the fuel that does not burn in the cylinder during the expansion stroke or the exhaust stroke after the main fuel injection; wherein
    when the secondary fuel injection is being executed, said fuel injection control means controls the secondary fuel injection based on the engine operating conditions in such a manner that the fuel supplied by the secondary fuel injection is discharged out of the cylinder before the end of the exhaust stroke.

2. A control system for an internal combustion engine according to claim 1, wherein said internal combustion engine is equipped with a variable valve timing means for varying the valve timing of the engine, and said fuel injection control means controls the secondary fuel injection in accordance with a change in the valve timing of the engine.

3. A control system for an internal combustion engine according to claim 1, wherein said fuel injection control means controls the secondary fuel injection in such a manner that the fuel supplied by the secondary fuel injection rides on the flow of the exhaust gas that is formed in the cylinder in the exhaust stroke heading toward the exhaust port.

4. A control system for an internal combustion engine comprising:

a direct cylinder fuel injection valve for directly injecting the fuel into a cylinder of an internal combustion engine; and a fuel injection control means which executes a main fuel injection to inject the fuel that burns in the cylinder by controlling said direct cylinder fuel injection valve, and executes, as required, a secondary fuel injection to inject the fuel that does not burn in the cylinder during the expansion stroke or the exhaust stroke after the main fuel injection; wherein said fuel injection control means advances the timing for injecting the secondary fuel with an increase in the amount of the fuel injected by the secondary fuel injection.

5. A control system for an internal combustion engine comprising:

a direct cylinder fuel injection valve for directly injecting the fuel into a cylinder of an internal combustion engine;

a fuel injection control means which executes a main fuel injection to inject the fuel that burns in the cylinder by controlling said direct cylinder fuel injection valve, and executes, as required, a secondary fuel injection to inject the fuel that does not burn in the cylinder during the expansion stroke or the exhaust stroke after the main fuel injection; and a deflecting means for deflecting the flow of the fuel supplied by the secondary fuel injection toward the exhaust port of the cylinder.

6. A control system for an internal combustion engine according to claim 5, wherein said deflecting means has a cavity formed in the top surface of the piston, so that the flow of fuel supplied by the secondary fuel injection is deflected toward said exhaust port along the surface of said cavity.

7. A control system for an internal combustion engine according to claim 5, wherein said deflecting means is equipped with an injection direction control means for changing the direction of fuel injected from the injection valve toward the exhaust port when the secondary fuel is injected.

8. A control system for an internal combustion engine comprising:

a direct cylinder fuel injection valve for directly injecting the fuel into a cylinder of an internal combustion engine; and a fuel injection control means which executes a main fuel injection to inject the fuel that burns in the cylinder by controlling said direct cylinder fuel injection valve, and executes, as required, a secondary fuel injection to inject the fuel that does not burn in the cylinder during the expansion stroke or the exhaust stroke after the main fuel injection; wherein said fuel injection control means sets the pressure of the secondary fuel injection at a value lower than the pressure of the main fuel injection.

9. A control system for an internal combustion engine comprising:

a direct cylinder fuel injection valve for directly injecting the fuel into a cylinder of an internal combustion engine; and a fuel injection control means which executes a main fuel injection to inject the fuel that burns in the cylinder by controlling said direct cylinder fuel injection valve, and executes, as required, a secondary fuel injection to inject the fuel that does not burn in the cylinder during the expansion stroke or the exhaust stroke after the main fuel injection; wherein said fuel injection control means calculates the amount of fuel remaining in the cylinder, which is part of the fuel supplied by the preceding secondary fuel injection, and corrects the amount of said main fuel injection based on said remaining amount of fuel.

10. A control system for an internal combustion engine comprising:

a direct cylinder fuel injection valve for directly injecting the fuel into a cylinder of an internal combustion engine; and a fuel injection control means which executes a main fuel injection to inject the fuel that burns in the cylinder by controlling said direct cylinder fuel injection valve, and executes, as required, a secondary fuel injection to inject the fuel that does not burn in the cylinder during the expansion stroke or the exhaust stroke after the main fuel injection; wherein said fuel injection control means, as required, executes said main fuel injection two times by dividing it into a first main fuel injection for forming a uniform air-fuel mixture in the cylinder and a second main fuel injection for forming a charge of a combustible air-fuel ratio mixture in the cylinder, and, when said secondary fuel injection is executed, calculates the amount of fuel remaining in the cylinder, which is part of the fuel supplied by the preceding secondary fuel injection, and corrects the amount of said first main fuel injection based on the remaining amount of fuel.

* * * * *